US008629872B1

(12) United States Patent
Phoa

(10) Patent No.: US 8,629,872 B1
(45) Date of Patent: Jan. 14, 2014

(54) SYSTEM AND METHOD FOR DISPLAYING AND ANALYZING FINANCIAL CORRELATION DATA

(71) Applicant: The Capital Group Companies, Inc., Los Angeles, CA (US)

(72) Inventor: Wesley Kym-Son Phoa, Los Angeles, CA (US)

(73) Assignee: The Capital Group Companies, Inc., Los Angeles, CA (US)

( * ) Notice: Subject to any disclaimer, the term of this patent is extended or adjusted under 35 U.S.C. 154(b) by 0 days.

(21) Appl. No.: 13/754,816

(22) Filed: Jan. 30, 2013

(51) Int. Cl.
*G06T 11/20* (2006.01)

(52) U.S. Cl.
USPC ...................................................... 345/440

(58) Field of Classification Search
USPC ...................................................... 345/440
See application file for complete search history.

(56) References Cited

U.S. PATENT DOCUMENTS

2004/0183800 A1* 9/2004 Peterson ....................... 345/440

OTHER PUBLICATIONS

J. de la Porte, B.M. Herbst, W. Hereman and S.J. van der Walt, An Introduction to Diffusion Maps, Proceedings of the 19th Symposium of the Pattern Recognition Association of South Africa (PRASA 2008), Cape Town, South Africa, Nov. 26-28, 2008, Ed.: F. Nicolls, University of Cape Town, Cape Town, South Africa (2008), pp. 15-25.*

Connor, Gregory and Korajczyk, Robert A., Factor Models of Asset Returns (Oct. 26, 2007) available at www.efalken.com/pdfs/connorkor07.pdf.*
Phao, Wesley, Portfolio Concentration and the Geometry of Comovement, available on www.SSRN.com on Jul. 17, 2012.*
Bengio, Yoshua et al.; "Learning Eigenfunctions Links Spectral Embedding and Kernel PCA"; Neural Computation 16; May 12, 2004; 33 pages.
Coifman, Ronald, R. et al.; "Diffusion Maps"; Science Direct—Applied and Computational Harmonic Analysis, Appl. Comput. Harmon. Anal. 21 (2006); Jun. 19, 2006; Published by Elsevier Inc.; pp. 5-30.
Conner, Gregory et al.; "Performance Measurement with the Arbitrage Pricing Theory: A New Framework for Analysis"; To appear in the Journal of Financial Economics 15 (1986, pp. 373-394); Revised Apr. 1985; 38 pages.

(Continued)

*Primary Examiner* — Xiao M. Wu
*Assistant Examiner* — Scott E Sonners
(74) *Attorney, Agent, or Firm* — Christie, Parker & Hale, LLP

(57) ABSTRACT

A method for displaying a matrix of correlations or other statistical measures of co-movement associated with a plurality of financial instruments, portfolios, indices, or asset classes is disclosed. The method includes: converting the matrix of correlations or other co-movement measures into a probability transition matrix; defining a corresponding abstract distance measurement between any two of the plurality of financial instruments, portfolios, indices, or asset classes based on the probability transition matrix; assigning coordinates in a Euclidean space to each of the plurality of financial instruments, portfolios, indices, or asset classes, wherein a Euclidean distance between any two financial instruments, portfolios, indices, or asset classes in the Euclidean space corresponds to the corresponding abstract distance measurement; and displaying on a display device the plurality of financial instruments, portfolios, indices, or asset classes based on more significant dimensions of the Euclidean space.

26 Claims, 17 Drawing Sheets

(56) References Cited

OTHER PUBLICATIONS

Embrechts, Paul et al.; "Correlation: Pitfalls and Alternatives" RISK; (pp. 69-71, May 1999); Mar. 1999; 8 pages.

Lafon, Stephane et al.; "Diffusion Maps and Coarse-Graining: A Unified Framework for Dimensionality Reduction, Graph Partitioning and Data Set Parameterization"; IEEE Transactions on Pattern Analysis and Machine Intelligence, vol. 28 No. 9, Sep. 2006 (pp. 1393-1403); 17 pages.

Maggioni, Mauro; "What is . . . Data Mining"; Notices of the American Mathematical Society; vol. 59, No. 4, 2012; pp. 532-534.

Nadler, Boaz et al.; "Diffusion Maps—a Probabilistic Interpretation for Spectral Embedding and Clustering Algorithms"; Lecture Notes in Computational Science and Engineering 58, 2007; pp. 238-260.

Von Luxburg, Ulrike; "A Tutorial on Spectral Clustering"; Statistics and Computing, 17 (4), 2007 (pp. 395-416), 32 pages.

Mantegna, Rosario N.; "Hierarchical Structure in Financial Markets", arXiv:cond-mat/9802256v1 [cond-mat.stat-mech] Feb. 24, 1998; 18 pages.

Leon, Carlos et al.; "Borradoes de Economia" Extracting the sovereigns' CDS market hierarchy: a correlation-filtering approach; Num. 766, 2013; Banco de la Republica (Central Bank of Colombia); 26 pages.

\* cited by examiner

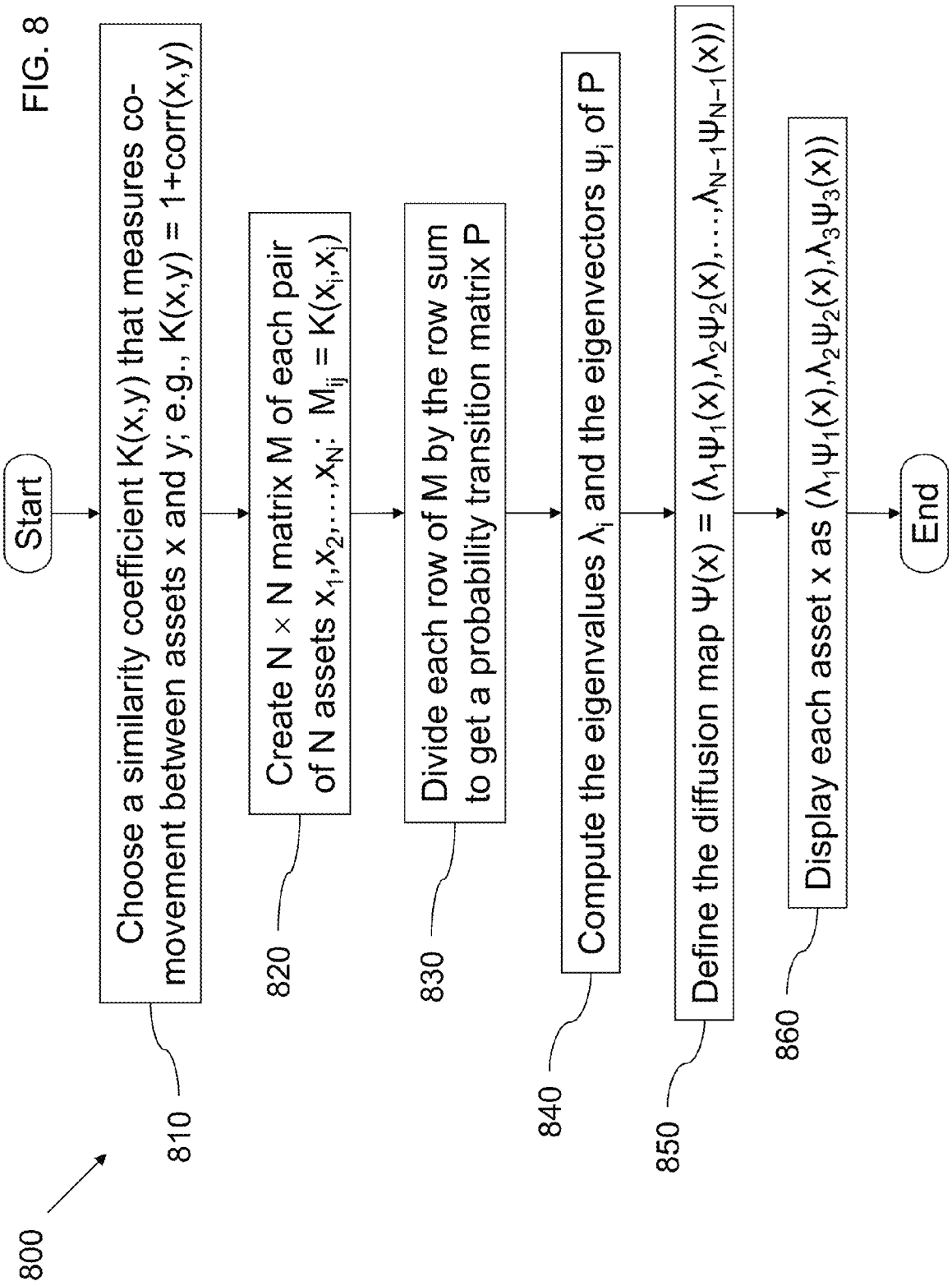

FIG. 9

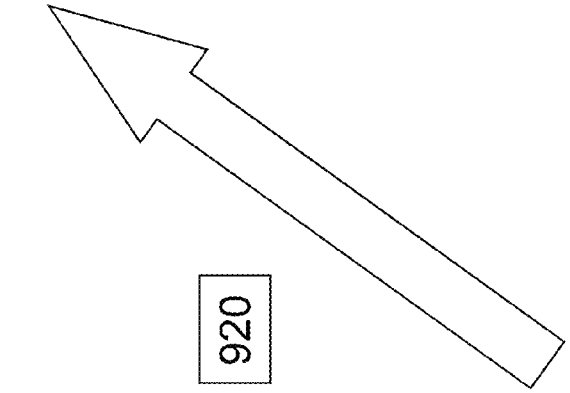

910: $K(x_1, x_1) = K(x_2, x_2) = K(x_3, x_3) = 1$
$K(x_1, x_2) = K(x_2, x_3) = 1/2$
$K(x_1, x_3) = 1/4$

920: $M = \begin{pmatrix} 1 & 1/2 & 1/4 \\ 1/2 & 1 & 1/2 \\ 1/4 & 1/2 & 1 \end{pmatrix}$ 930: $P = \begin{pmatrix} 4/7 & 2/7 & 1/7 \\ 1/4 & 1/2 & 1/4 \\ 1/7 & 2/7 & 4/7 \end{pmatrix}$ 940: $\lambda_0 = 1, \lambda_1 = 3/7, \lambda_2 = 3/14$ $\psi_0 = \begin{pmatrix} 1/\sqrt{3} \\ 1/\sqrt{3} \\ 1/\sqrt{3} \end{pmatrix}, \psi_1 = \begin{pmatrix} 1/\sqrt{2} \\ 0 \\ -1/\sqrt{2} \end{pmatrix}, \psi_2 = \begin{pmatrix} 4/9 \\ -7/9 \\ 4/9 \end{pmatrix}$ 950: $\Psi = \begin{pmatrix} 3\sqrt{2}/14 & 2/21 \\ 0 & -1/6 \\ -3\sqrt{2}/14 & 2/21 \end{pmatrix}$ 960: $x_1 = (3\sqrt{2}/14, 2/21), x_2 = (0, -1/6), x_3 = (-3\sqrt{2}/14, 2/21)$

SYSTEM AND METHOD FOR DISPLAYING AND ANALYZING FINANCIAL CORRELATION DATA

FIELD

Aspects of embodiments of the present invention relate to systems and methods of displaying and analyzing correlation data and other statistical measures of co-movement for financial assets and portfolios.

BACKGROUND

Stocks and other securities and financial instruments are frequently arranged in portfolios or other collections containing numerous different financial assets. A problem in portfolio management is understanding the co-movement of different assets or asset classes, and the implications for portfolio construction and risk management. According to one embodiment, co-movement is the correlation of asset prices or valuations over time (for example, which stocks tend to rise or drop in value as a group). Diversifying such portfolios (such as including assets whose financial behavior tends to be independent over time as opposed to being highly correlated) is one of several important financial investment functions.

Analyzing the correlation of a small number (such as six or fewer) of different stocks may be relatively straightforward. For example, one may directly examine the matrix of correlations or co-movement indicators (i.e., an N×N matrix for N assets) since such a matrix has relatively few distinct entries (at most a few dozen for N≤6). However, when analyzing a large number of assets (for example, 100 or 500 such assets), the number of combinations of any two of them grows quadratically and quickly overwhelms any attempt by an investor to grasp the structure of the correlation matrix as a whole, or to derive salient characteristics from it for investment purposes.

SUMMARY

Embodiments of the present invention are directed toward systems and methods of displaying and analyzing financial correlation data. Further embodiments are directed toward displaying financial correlation data of large numbers of assets in meaningful graphical depictions that reduce the underlying complexity of the numerous interrelationships, thus making them significantly simpler to appreciate. Still further embodiments are directed to analyzing the displayed correlation data (for example, measuring overall portfolio concentration).

In an exemplary embodiment, a system and method for constructing a three-dimensional (3-D) scatter diagram for displaying on a display device is provided. In the scatter diagram, each of the points represents an asset. Correlation between any two assets is represented by the distance between their corresponding points in the scatter diagram, with highly correlated assets being close to each other in the scatter diagram, weakly correlated assets being far apart, and the degree of correlation being inversely proportional to the distance between the corresponding points. Such a scatter diagram permits visual analysis of assets and portfolios to identify concentrations of risk, including risk concentrations that might otherwise go unnoticed.

According to an exemplary embodiment of the present invention, a method for displaying a matrix of correlations or other statistical measures of co-movement associated with a plurality of financial instruments, portfolios, indices, or asset classes is provided. The method includes: converting the matrix of correlations or other co-movement measures into a probability transition matrix; defining a corresponding abstract distance measurement between any two of the plurality of financial instruments, portfolios, indices, or asset classes based on the probability transition matrix; assigning coordinates in a Euclidean space to each of the plurality of financial instruments, portfolios, indices, or asset classes, wherein a Euclidean distance between any two financial instruments, portfolios, indices, or asset classes in the Euclidean space corresponds to the corresponding abstract distance measurement; and displaying on a display device the plurality of financial instruments, portfolios, indices, or asset classes based on more significant dimensions of the Euclidean space.

A number of the more significant dimensions may be three.

The more significant dimensions may include three of the most significant dimensions.

The displaying of the financial instruments, portfolios, indices, or asset classes may include displaying an identifying label for each of the financial instruments, portfolios, indices, or asset classes in a 3-dimensional Euclidean representation on the display device.

The method may further include modifying the 3-dimensional Euclidean representation on the display device in response to a user command.

The method may further include displaying successive representations of correlation data or other statistical measures of co-movement as observed on successive dates.

The method may further include adjusting a color or size of the identifying label to correspond to a respective value of an additional numerical characteristic being displayed in the 3-dimensional Euclidean representation on the display device for each of the financial instruments, portfolios, indices, or asset classes.

A number of the more significant dimensions may be two.

The more significant dimensions may include two of the most significant dimensions.

The displaying of the financial instruments, portfolios, indices, or asset classes may include displaying an identifying label for each of the financial instruments, portfolios, indices, or asset classes in a 2-dimensional Euclidean representation on the display device.

The method may further include generating a measure of diversification of the financial instruments, portfolios, indices, or asset classes.

The generating of the measure of diversification of the financial instruments, portfolios, indices, or asset classes may include generating the measure of diversification using the more significant dimensions of the Euclidean space.

The measure of diversification may include a global concentration, a relative global concentration, or a largest local concentration.

The measure of diversification may include a global concentration. The generating of the global concentration may include: assigning a weight to each of the financial instruments, portfolios, indices, or asset classes; and weighting a contribution of each of the financial instruments, portfolios, indices, or asset classes by its respective said weight in the global concentration.

The method may further include comprising generating a portfolio diversification measure by: identifying ones of the financial instruments, portfolios, indices, or asset classes; assigning second weights to respective said ones of the financial instruments, portfolios, indices, or asset classes; and generating the global concentration by only using the ones of the financial instruments, portfolios, indices, or asset classes in place of each of the financial instruments, portfolios, indices, or asset classes, and using the second weights in place of the weight of each of the financial instruments, portfolios, indices, or asset classes.

The method may further include generating a sequence of successively less significant local concentrations of the financial instruments, portfolios, indices, or asset classes.

The method may further include generating a plurality of relative local concentrations of the Euclidean space.

The method may further include generating a numerical summary measure of accuracy with which the Euclidean distance as measured in the more significant dimensions of the Euclidean space represents the corresponding abstract distance measurement.

The method may further comprising changing a sign of one of the coordinates for improving consistency of the displaying of the financial instruments, portfolios, indices, or asset classes over a period of time.

The method may further include re-ordering the coordinates for improving consistency of the displaying of the financial instruments, portfolios, indices, or asset classes over a period of time.

The financial instruments may include publicly traded equity securities, publicly traded fixed income securities, publicly available mutual funds, exchange-traded funds, publicly traded currencies, exchange-traded futures, or options on exchange-traded futures.

The method may further include: in response to the displaying on the display device, receiving a user command to modify an attribute for a selected one of the plurality of financial instruments, portfolios, indices, or asset classes; and modifying the attribute in response to the user command.

The attribute may correspond to an investment amount.

The correlations may correspond to financial returns.

According to another exemplary embodiment of the present invention, a system for displaying a matrix of correlations or other statistical measures of co-movement associated with a plurality of financial instruments, portfolios, indices, or asset classes is provided. The system includes a processor, a display device coupled to the processor, and a nonvolatile storage device coupled to the processor and storing instructions. The instructions, when executed by the processor, cause the processor to: convert the matrix of correlations or other co-movement measures into a probability transition matrix; define a corresponding abstract distance measurement between any two of the plurality of financial instruments, portfolios, indices, or asset classes based on the probability transition matrix; assign coordinates in a Euclidean space to each of the plurality of financial instruments, portfolios, indices, or asset classes, wherein a Euclidean distance between any two financial instruments, portfolios, indices, or asset classes in the Euclidean space corresponds to the corresponding abstract distance measurement; and display on the display device the plurality of financial instruments, portfolios, indices, or asset classes based on more significant dimensions of the Euclidean space.

A number of the more significant dimensions may be three.

The instructions, when executed by the processor, may further cause the processor to control the display device to display the financial instruments, portfolios, indices, or asset classes by displaying an identifying label for each of the financial instruments, portfolios, indices, or asset classes in a 3-dimensional Euclidean representation on the display device.

The processor may be further configured to receive a user command. The instructions, when executed by the processor, may further cause the processor to modify the 3-dimensional Euclidean representation on the display device in response to the user command.

BRIEF DESCRIPTION OF THE DRAWINGS

The accompanying drawings, together with the specification, illustrate exemplary embodiments of the present invention. These drawings, together with the description, serve to better explain aspects and principles of the present invention.

FIG. 8 shows an exemplary method of creating a scatter diagram according to an embodiment of the present invention.

FIG. 9 shows an example of the scatter diagram method of FIG. 8 being applied to a small number of assets according to an embodiment of the present invention.

DETAILED DESCRIPTION

Exemplary embodiments of the present invention will now be described with reference to the accompanying drawings. In the embodiments, for ease of description, financial assets or instruments (for example, stocks, bonds, currencies, etc.) are discussed and referred to simply as "assets" or even more simply as "stocks." Collections of such assets (such as indices or weighted combinations of the assets) are referred to as "portfolios." It is to be understood, however, that as used in this disclosure, an asset (or stock) refers to any financial instrument (such as a publicly traded equity security, fixed income security, mutual fund, exchange-traded fund, currency, futures or options on exchange-traded futures, etc.) as well as collections of these assets into portfolios, indices, or asset classes.

Figure 1:
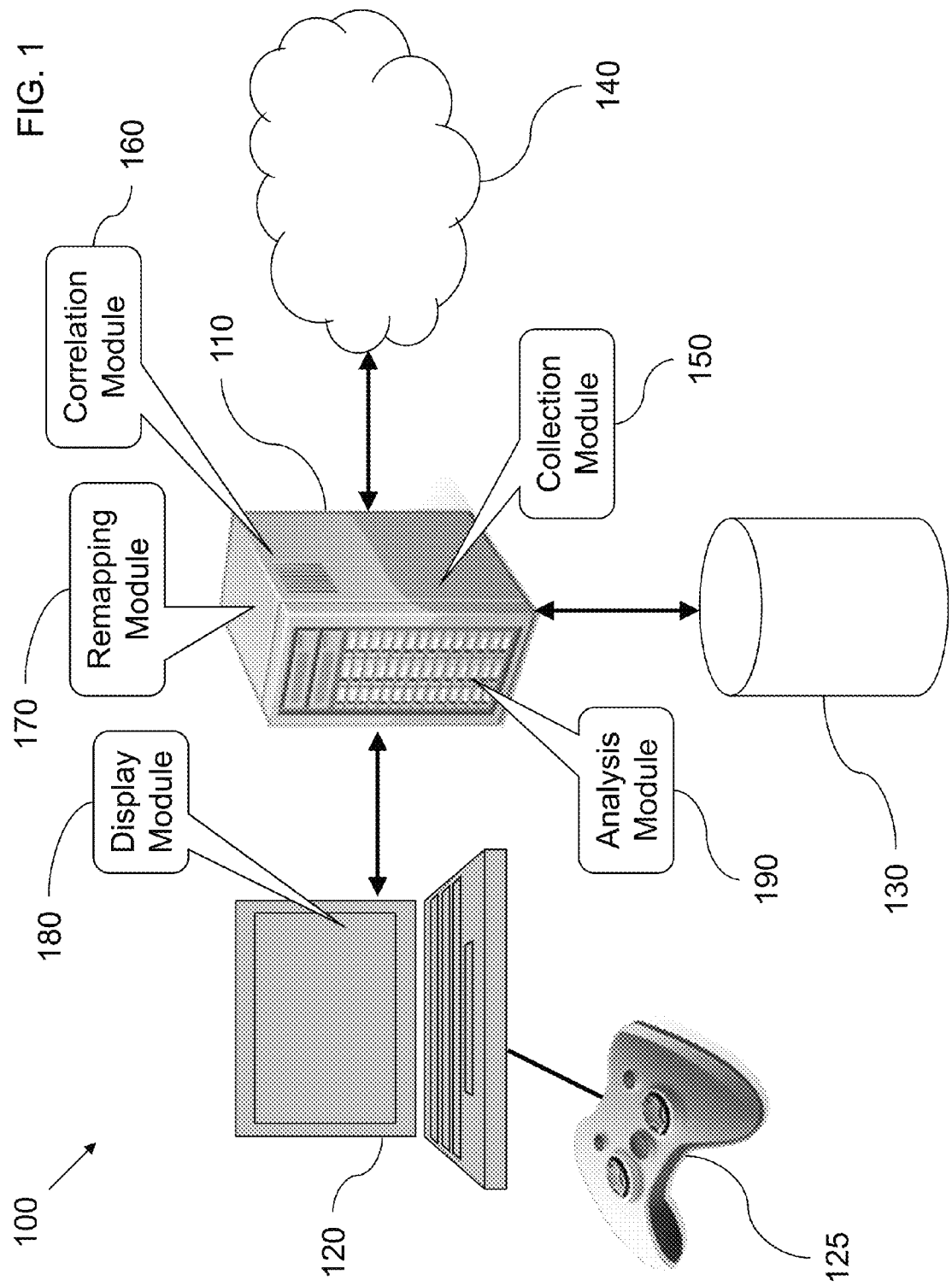
FIG. 1 illustrates an exemplary computer system for collecting, generating, remapping, displaying, and analyzing correlation data of financial assets according to an embodiment of the present invention.

FIG. 1 illustrates an exemplary computer system for collecting, generating, remapping, displaying, and analyzing correlation data of financial assets according to an embodiment of the present invention.

In FIG. 1, the computer system 100 includes a computer 110 (or computer device), a display device 120 (such as a laptop computer), an optional controller 125 (such as a gaming controller), and a nonvolatile storage device 130. The computer 110 may be, for example, a server computer, a personal computer, or any such computing device including a processor for executing machine instructions and a memory for accessing data (such as numbers or calculations derived from numbers) and machine instructions (such as code for programs intended to be run on the computer system 100).

The display device 120 is configured to display images (such as from processed data or other visual depictions) as directed by the computer 110. To this end, the computer 110 may include a graphics processor to render specialized graphics, such as three-dimensional (3-D) images, that may be manipulated (for example, rotated or zoomed, such as by a user) in various ways. The display device 120 may be, for example, a flat screen display device, or a laptop computer (as illustrated in FIG. 1). The display device 120 may be a 2-D display device capable of rendering views of 3-D images. The display device 120 may also be a 3-D display device. The laptop computer may be equipped with the graphics processor in place of, or in addition to, the computer 110. There may also be a separate controller 125, such as a gaming controller (as illustrated in FIG. 1) to assist with display interaction between a user and the computer 110 and/or display device 120. In one embodiment, the controller 125 assists the user in rotating, zooming, and panning a 3-D image displayed on the display device 120.

The nonvolatile storage 130 may be, for example, a disk drive for accessing and storing data over time with the computer 110. For instance, the nonvolatile storage 130 may be used to store a database of financial information, such as asset values, or program code (such as computer instructions or modules to be loaded and run on the computer 110 to perform embodiments of the invention). The computer 110 may also be connected to a network 140—such as a local area network (LAN), a wide area network (WAN), and/or a public WAN such as the Internet—for communication with external sources of information, data, and resources.

According to one embodiment, the memory of the computer 110 (and/or the display device 120, when the display device is implemented as, for example, a laptop computer) may store one or more modules for performing various tasks. A collection module 150 may be configured to collect raw financial data based on historical returns and/or generate projected financial data based on predictive methods such as modeling or extrapolating. A correlation module 160 may be configured for generating correlation data of financial assets from the financial data produced by the collection module 150. A remapping module 170 may be configured to remap the correlation data produced by the correlation module 160 into a form more amenable to display and analysis. A display module 180 may be configured for displaying the remapped correlation data generated by the remapping module 170 on a display device (such as in a 3-D scatter diagram). An analysis module 190 may be configured to further process the remapped correlation data generated by the remapping module 170 (for example, to determine an overall portfolio measurement of concentration or diversification). Throughout this discussion, the foregoing modules are assumed to be separate functional units, but those skilled in the art will recognize that the functionality of various units may be combined or integrated into a single module, or further subdivided into further sub-modules without departing from the spirit of the invention.

In addition, while the computer system 100 of FIG. 1 shows several different separate components, the present invention is not limited thereto. In other embodiments, additional components (such as client computers) may be present, or various components (such as processors) may be integrated, including the entire computer system (such as in a laptop computer).

Figure 2:
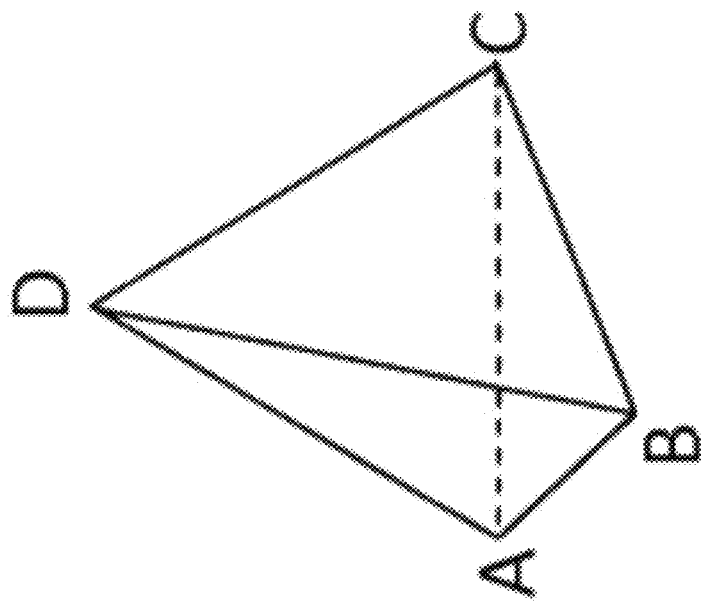
FIG. 2 shows an exemplary 3-D plot of different financial assets according to an embodiment of the present invention.

FIG. 2 shows a simplified 3-D plot of different financial assets according to an embodiment of the present invention.

In FIG. 2, four assets are displayed by the display module 180 on a display device. While the exemplary scatter diagrams described in embodiments above may often be laid out accurately on a flat page (e.g., in 2-D), adding a third dimension (e.g., in 3-D) frequently enhances the accuracy and allows relationships to be displayed that may not be shown in two dimensions. For example, if four assets A, B, C, and D each exhibit a pairwise correlation of 0.5, and that 0.5 needs to be faithfully represented by equal distances between each pair of points in two dimensions (i.e., AB=AC=AD=BC=BD=CD=0.5), it would be impossible. However, such a relationship may be displayed in three dimensions, as shown in FIG. 2.

In the illustrated example of FIG. 2, the distance between any pair of assets indicates the correlation between those assets. For example, in the illustrated example where the distance between any pair of assets is 0.5, the correlation between any pair of the assets will also be the same.

FIGS. 3-6 are exemplary screen shots of three dimensional (3-D) scatter diagrams of financial asset correlations according to an embodiment of the present invention. The scatter diagrams may depict correlations of particular financial assets over particular periods of time. For example, in the example scatter diagrams of FIGS. 3-6, correlations of 500 stocks from the Standard & Poor's (S&P) 500 index are measured at various times. The particular financial assets in the scatter diagrams may be identified via identifying labels or well-known symbols, such as, for example, the symbols by which their corresponding shares are traded and listed. For instance, the symbol IBM may be used to represent International Business Machines Corporation, while MSFT may be used to represent Microsoft Corporation.

According to one embodiment, the labels are displayed in the scatter diagrams with varying sizes where the selected size may reflect, for example, the corresponding company's market cap (e.g., market capitalization, such as the total value of the issued shares). According to one embodiment, larger labels may be used for indicating proportionally larger market caps of particular assets, such as for AAPL (Apple Incorporated), XOM (Exxon Mobil Corporation), GE (General Electric Company), JNJ (Johnson & Johnson), PFE (Pfizer Incorporated), and T (AT&T Incorporated). In other embodiments, the market cap may be represented using other visual indicators, such as, for example, color. In still other embodiments, the size of the label may be used to reflect another measurement, such as volatility (e.g., variation of the price of the stock or other financial instrument over time).

According to one embodiment of the invention, the color of each label may indicate historical returns for the identified asset. The labels may be displayed in red, for example, to indicate negative returns, or in green to represent positive returns. To better track selected stocks, more distinctively colored labels may be used.

According to one embodiment of the invention, the closer two stocks depicted in the scatter diagram are (in distance), the more correlated their financial returns are over time (for example, the more their stock values rise or fall together, or the more similar their stock fluctuations are with respect to other stocks). According to one embodiment, the correlation between two stocks over the relevant period is inversely proportional to the Euclidean distance between the two stocks depicted in the 3-D scatter diagram.

In addition, because the data is displayed in a 3-D format, it may be better appreciated on a display device (such as a 3-D display or a 2-D display with graphics support for 3-D renditions, such as for rotating and zooming). For instance, the symbols of the scatter diagram may be oriented to face the same direction although not limited thereto. In an exemplary embodiment for display on a 2-D display device, when the displayed 3-D image is rotated, the symbols also rotate to create the impression that the symbols maintain their orientation throughout the rotation (which helps highlight the depth of the symbol on the 2-D display device, that is, the dimension perpendicular to the 2-D display surface). The generation of these scatter diagrams may be performed by the display module 180. In this regard, the display module 180 is configured to render points in a multi-dimensional space as a scatter diagram that visually displays (on a suitable display device) correlation data and other numerical characteristics of the corresponding financial assets.

Figure 3:
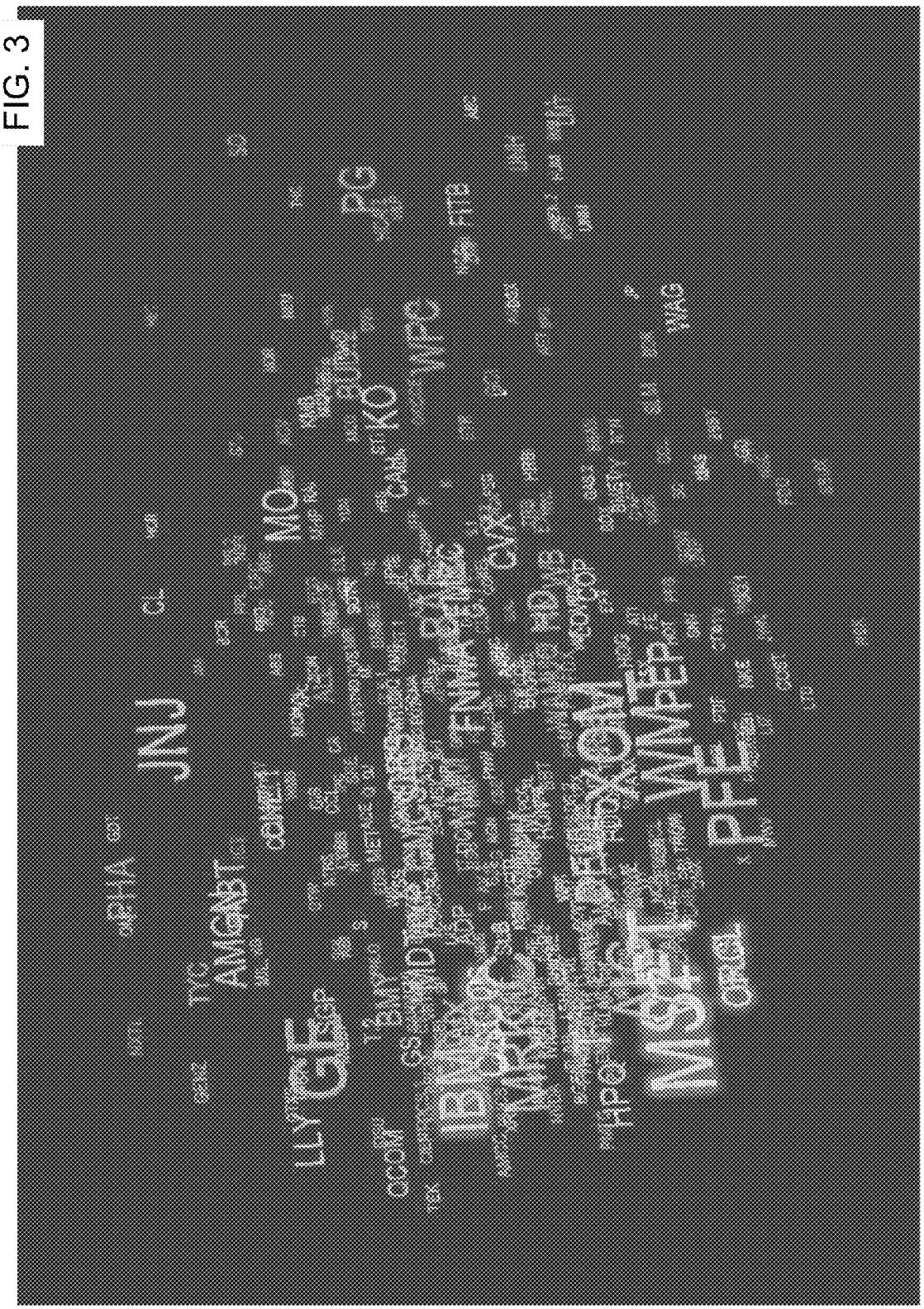
FIGS. 3-6 are exemplary screen shots of three dimensional (3-D) scatter diagrams of financial asset correlations according to an embodiment of the present invention.
Figure 4:
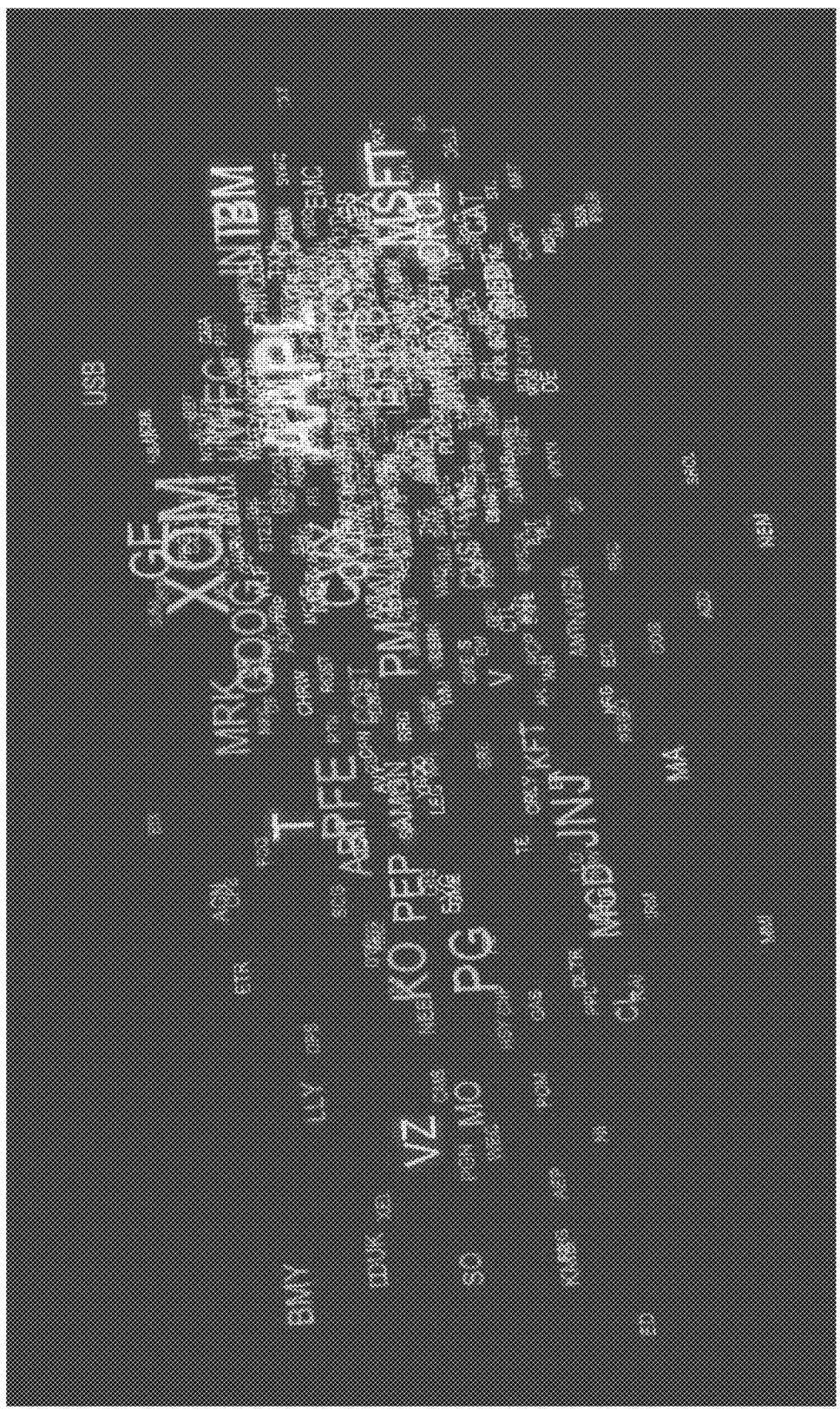

In the exemplary scatter diagram of FIG. 3, depicts 12 months of correlation and return data for the S&P 500 are depicted based on return data collected through December 2002. FIG. 4 is a similar scatter diagram for April 2012 (almost ten years later). A person of skill in the art reviewing the scatter diagrams of FIGS. 3 and 4 will understand that Microsoft (MSFT) stayed relatively close to Oracle (ORCL) in 2002 versus 2012 (indicating a high degree of correlation at both periods), while Verizon (VZ) and AT&T (T) moved far away from these two companies (MSFT and ORCL) by 2012 (indicating a loss of correlation in 2012 that was not seen in 2002).

Figure 5:
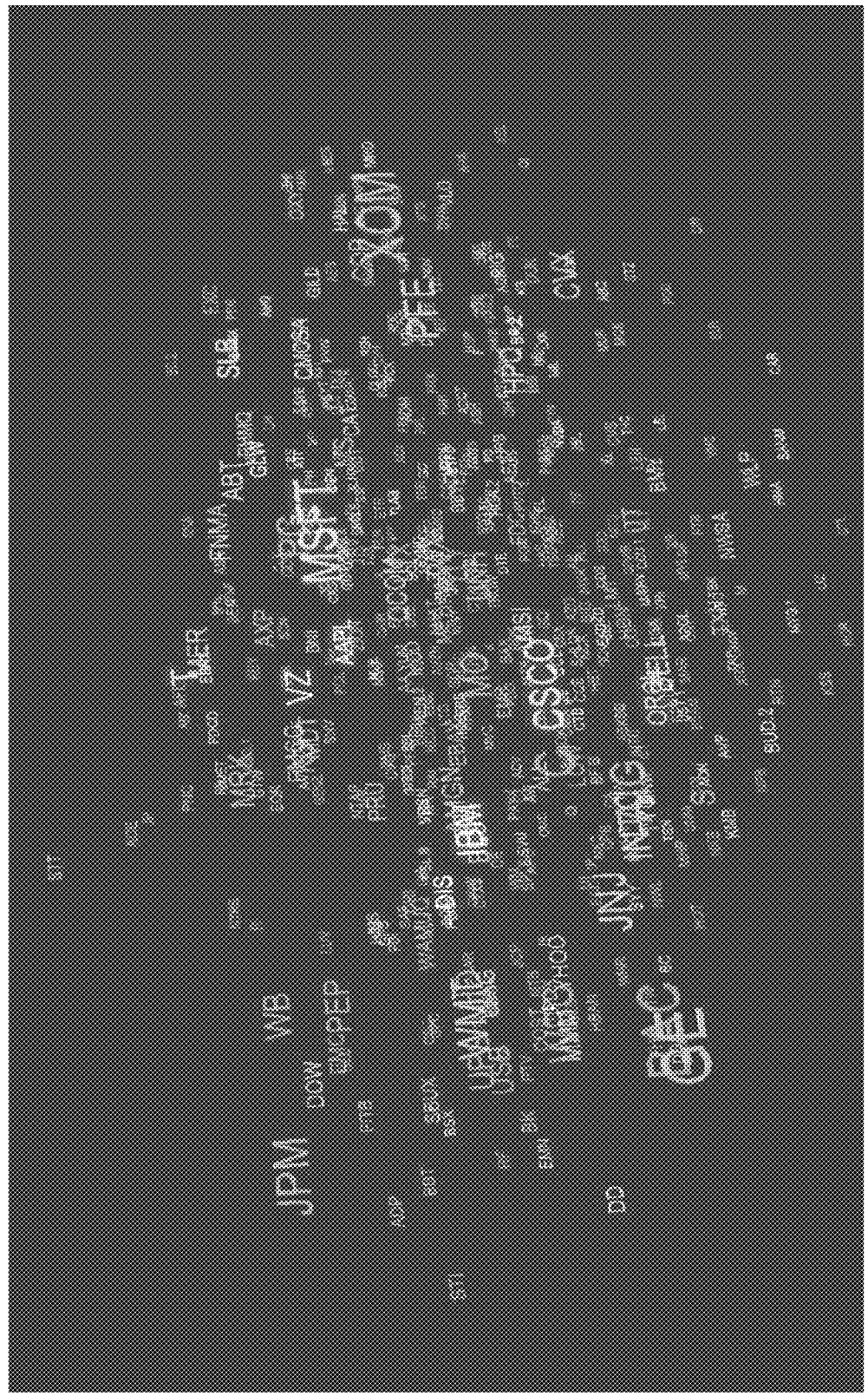
Figure 6:
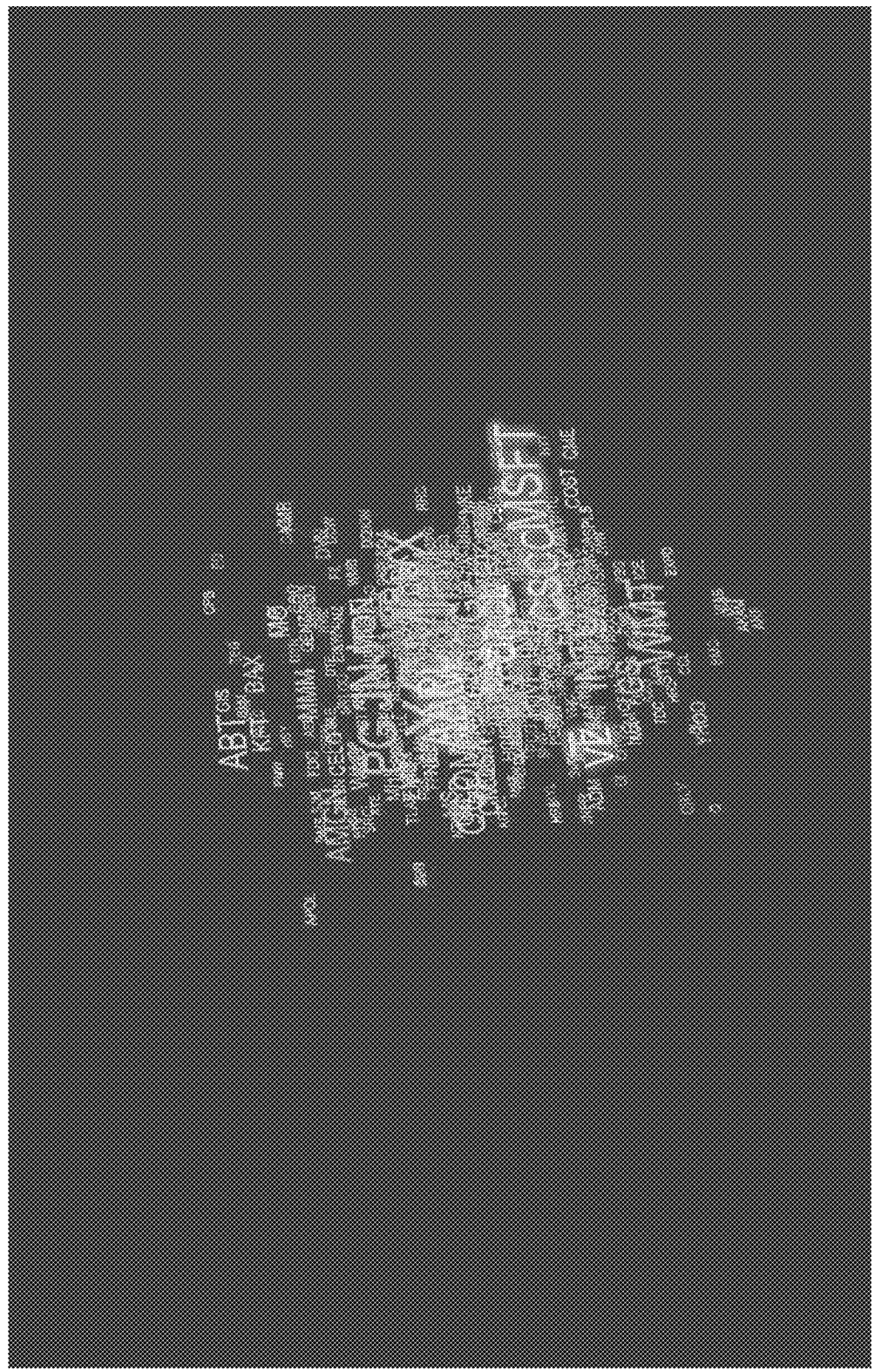

According to one embodiment, the 500 symbols in the exemplary scatter diagrams of FIGS. 3-6 further create a cloud-like image. For example, FIG. 5 depicts the 12 months of correlation and return data for assets in the S&P 500 from March 2006, while FIG. 6 depicts likewise for March 2009 (three years later). As shown in FIG. 5 for the 2006 data, the individual stocks are fairly spread out creating an image of a sparse cloud, with most stocks performing generally independently of the others. However, as shown in FIG. 6 for the 2009 data, the stocks are more tightly bunched creating an image of a dense cloud, with most stocks exhibiting a tighter correlation the others. The 2006 data corresponds to a healthier time in the economy. By contrast, the 2009 data corresponds to a market turndown and the early stages of a recovery therefrom. Thus, the size of the cloud may be used as an indication of how much the individual stocks move as a group during the corresponding period being displayed: the smaller the cloud, the more co-movement of the group as a whole.

Exemplary Techniques

In an exemplary embodiment, financial return data between different assets may be accumulated over time by the collection module 150, such as over a 12-month period according to any mechanism conventional in the art. This financial return data may also be projected by the collection module 150 based on other sources of information (e.g., modeling, simulation, extrapolation, external sources) as will be apparent to a person of skill in the art. Regardless of the collection method, the result is a set of data points (in N-dimensional space, for N separate assets), with a value for each asset in each data point.

A common measure of the co-movement of two assets is the correlation between their returns. In an exemplary embodiment, the correlation between any pair of assets may then be determined by the correlation module 160 using any statistical measure of correlation. For ease of description, an assumption is made that this correlation may be transformed into a similarity coefficient (or similarity kernel) $K(x,y)$, which is a nonnegative number representing the similarity between a pair of assets x and y using the corresponding values for x and y in the set of data points. The correlation module 160 may compute $K(x,y)$ for each combination of assets x and y.

In exemplary embodiments of the present invention, $K(x,y)$ has the property that the closer the similarity between two assets x and y, the larger the value of $K(x,y)$. Thus, in one exemplary embodiment, for a given asset x, the similarity kernel $K(x,y)$ maximizes when comparing x to the same asset, $K(x,x)$, and minimizes (for example, takes on the value 0) when comparing x to a completely independent asset y. In addition, for ease of description, $K(x,y)$ is assumed to have the property that $K(x,y)=K(y,x)$, that is, $K(x,y)$ is symmetric, though the invention is not limited thereto.

As a non-limiting example of such a similarity kernel $K(x,y)$, in one embodiment, $1+\mathrm{corr}(x,y)$ is used by the correlation module 160 to determine the correlation data, where $\mathrm{corr}(x,y)$ is the standard correlation coefficient. The function $\mathrm{corr}(x,y)$ takes on values between −1 and +1, with −1 representing perfect negative linear correlation, 0 indicating no linear correlation (such as for independent data), and +1 indicating perfect positive linear correlation. The function $\mathrm{corr}(x,y)$ is undefined when either of the two variables takes on a constant value over the entire set of data points. The function $1+\mathrm{corr}(x,y)$ is thus a nonnegative number that measures the linear correlation between the two variables and takes on values between 0 and 2.

Given the similarity kernel $K(x,y)$, in one exemplary embodiment, the correlation module 160 computes $K(x,y)$ for all pairs $(x,y)$ of the N assets under consideration using the corresponding entries in the set of data points. Assuming $K(x,y)=K(y,x)$ for any pair $(x,y)$ of assets and that $K(x,x)$ is fixed (such as 2) for each asset x, the correlation module 160 thus defines $N(N-1)/2$ separate correlation coefficients, one for each pair $(x,y)$ of distinct assets. In one exemplary embodiment, the correlation module 160 numbers the N assets $x_1, x_2, \ldots, x_N$, and arranges these similarity coefficients in an N×N correlation matrix M, where the ith row represents asset $x_i$, the jth column represents asset and similarity coefficient $M_{ij}=K(x_i, x_j)$ for all i and j between 1 and N.

For N separate assets, the above techniques process N-dimensional points, which may be difficult to display with two or three dimensions for larger values of N, such as N=100 or 500. Accordingly, in an exemplary embodiment, the remapping module 170 remaps the correlation data produced by the correlation module 160 into a lower dimensional space for easier use in displaying the correlation data and in further processing the correlation data.

In this regard, the row vectors of M may be examined using a mathematical theory of random walks (or random walk Markov chains) as is well known in the art. In order to transform the correlation coefficients into probability format (for use in random walks), in one exemplary embodiment, the correlation module 160 divides each row of M by its corresponding row sum. This operation yields a probability transition matrix P. For a given row i (representing the ith asset $x_i$), the jth entry $P_{ij}$ thus represents the relative correlation of $x_j$ to $x_i$, namely by the proportion $P_{ij}/P_{ii}$, subject to the restriction that the row sum $$\sum_j P_{ij} = 1.$$

The remapping module 170 considers each entry $P_{ij}$ of P to represent a probability that a hypothetical trader (or arbitrageur) would exchange asset $x_i$ with asset $x_j$ in one time step. In one embodiment, the row vectors of P are used to perform a "random walk" (i.e., a series of asset exchanges) where the intent may be to keep as similar a portfolio as possible from a risk perspective (such as trying to favor asset exchanges when they appear to exchange assets having similar correlation data). That is, stocks whose behavior is not similar are not likely to be exchanged for one another during the "random walk." The "random walk" is used to define an abstract distance measure $d(x,y)$ between every pair of assets x and y, such that $d(x,y)$ is greater for pairs of assets x and y which are less likely to be exchanged for one another. For example, $d(x,y)$ can be the standard (Euclidean) distance between the corresponding row vectors of x and y in P.

The remapping module 170 then assigns coordinates to each asset in Euclidean space, with dimension equal to N−1 where N is the number of assets, in such a way that for each pair of assets x and y, the Euclidean distance between their coordinates is equal to their abstract distance measure $d(x,y)$, thus providing a concrete geometrical realization of the abstract distance measure $d(x,y)$. Thus, in one exemplary embodiment, when considering asset similarity to be a random walk, the remapping module 170 uses diffusion maps to perform the remapping of the correlation data generated by the correlation module 160.

Upon building and displaying a scatter diagram of the N points in an (N−1)-dimensional space based on the transition matrix P and upon a user visually inspecting the scatter diagram, the user may identify in a relatively straightforward manner the similarity (or dissimilarity) between two displayed assets. For example, the user may easily discern the similarity of their corresponding individual correlations with each of the other assets, as measured by K, based on how far apart their corresponding points appear in the scatter diagram.

However, (N−1)-dimensional space is generally hard to visualize beyond a smaller number of dimensions (such as two or three dimensions). Even if other representations (for example, size or color) were to be used to represent other dimensions, such an approach may not display more than five dimensions comfortably in terms of being able to visibly discern which assets are truly close to each other and which are far apart. Five dimensions is significantly smaller than, for example, the 100 dimensions needed to display the S&P 100 stocks (or the 500 dimensions needed to display the S&P 500 stocks).

Accordingly, embodiments of the present invention provide for a technique to display close approximations of these (N−1)-dimensional distances between these row vectors of P in a much lower dimensional space (such as 2-D or 3-D), which is considerably simpler to visualize. One such technique is to use diffusion maps, which is described in greater detail with reference to FIG. 8. In one exemplary embodiment, the remapping module 170 uses a diffusion map to remap the probability transition matrix (output by the correlation module 160) into a low-dimensional Euclidean space that closely preserves the distances (as measured by the correlation module 160) between the corresponding row vectors of the probability transition matrix.

The diffusion map may provide a way to visualize all the correlations together. In one exemplary embodiment, the remapping module 170 uses the diffusion map to translate the correlation matrix of a set of assets (as converted into a probability transition matrix by the correlation module 160) into a scatter diagram in a Euclidean space (such as a 3-D space), such that distances between points in the scatter diagram correspond to correlations between their associated assets. For example, the closer two assets are in the diagram, the higher their correlation.

Figure 7:
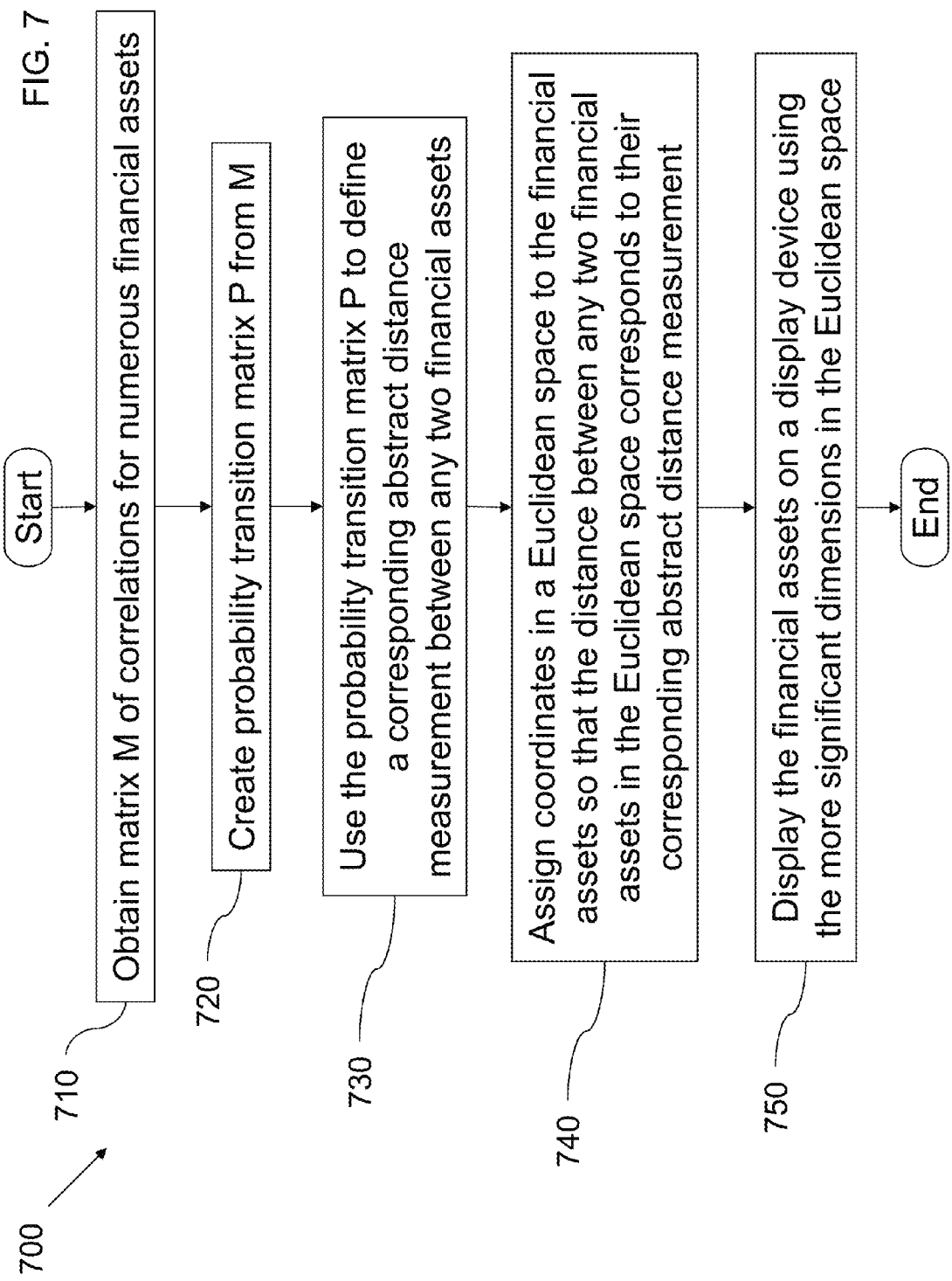
FIG. 7 shows an exemplary method of displaying a matrix of correlations for numerous financial assets according to an embodiment of the present invention.

FIG. 7 is a flow diagram of a process for creating and displaying a scatter diagram for numerous financial assets according to an embodiment of the present invention. The process may be described in terms of a software routine implemented, for example, by the correlation module 160. A person of skill in the art should recognize, however, that the process may be implemented via hardware, firmware (e.g. via an ASIC) or any combination of software, firmware, and/or hardware. Furthermore, the sequence of steps of the process is not fixed, but can be altered into any desired sequence as recognized by a person of skill in the art.

While the process in the exemplary embodiment of FIG. 7 is implemented on a matrix M of correlations for numerous financial assets, the term "financial assets" may encompass a wide range of financial entities, such as financial instruments, portfolios, indices, or asset classes. In addition, the term "correlations" may refer to any statistical measure of co-movement for these financial assets.

Processing begins, and in step 710, the correlation module 160 generates or otherwise obtains a matrix M of correlations for various financial assets. For example, the matrix M may be calculated from financial return data over time (as may be collected by the collection module 150), or it may be supplied from an external source.

In step 720, the matrix M of correlations or other co-movement measures is converted into a probability transition matrix P by the correlation module 160. For example, the correlations matrix M may be converted into a probability transition matrix P by multiplying by the inverse of the corresponding degree matrix D of M.

In step 730, the correlation module 160 uses the probability transition matrix P to define a corresponding abstract distance measurement between any two of the financial assets for which correlations were obtained. For example, the distance between any two financial assets may be defined to be the standard (Euclidean) distance between their corresponding row vectors in P.

In step 740, the remapping module 170 assigns coordinates in a Euclidean space to each of the financial assets via an assignment $\Psi$ in such a way that the distance between any two financial assets in the Euclidean space closely corresponds to their corresponding abstract distance measurement defined in step 730. For example, the remapping module 170 may use a diffusion map to build $\Psi$, such that the abstract distance defined in step 730 is preserved (or nearly preserved) in the Euclidean space defined in step 740.

In step 750, the display module 180 displays the financial assets on a display device using the more significant dimensions of the Euclidean space. For example, the display module 180 may use the three most significant dimensions of the Euclidean space to build a 3-D scatter plot of the financial assets, such as, for example, the scatter diagrams of FIGS. 3-6. The display module 180 may then display the 3-D scatter diagram on a 3-D display or on a 2-D display that supports displaying 3-D images.

FIG. 8 is a more detailed flow diagram of a process for creating and displaying a scatter diagram for N financial assets $x_1, x_2, \ldots, x_N$ according to an embodiment of the present invention. The process may be described in terms of a software routine implemented, for example, by the correlation module 160. A person of skill in the art should recognize, however, that the process may be implemented via hardware, firmware (e.g. via an ASIC) or any combination of software, firmware, and/or hardware. Furthermore, the sequence of steps of the process is not fixed, but can be altered into any desired sequence as recognized by a person of skill in the art.

In step 810, a similarity coefficient K(x,y) is chosen by the correlation module 160. For example, K(x,y) may be 1+corr(x,y). In one exemplary embodiment, the correlation module 160 may choose a similarity kernel based on the type of corresponding financial data that is available for the assets (for example, financial data that is collected or otherwise obtained or generated by the collection module 150).

In step 820, the correlation module 160 creates an N×N correlation matrix M of the N assets, where $M_{ij}=K(x_i,x_j)$ for all i and j between 1 and N.

In step 830, the correlation module 160 divides each row of M by its corresponding row sum to yield a probability transition matrix P. In one exemplary embodiment, the correlation module 160 uses the (Euclidean) distance between the ith and jth row vectors (in N-dimensional space) to define a corresponding similarity value between the corresponding assets $x_i$ and $x_j$. In step 840, the remapping module 170 computes the eigenvalues $\lambda_0, \lambda_1, \lambda_2, \ldots, \lambda_{N-1}$ and corresponding eigenvectors $\psi_0, \psi_1, \psi_2, \ldots, \psi_{N-1}$ for P. Since P is a probability transition matrix, in one exemplary embodiment, the remapping module 170 sorts the eigenvalues such that $\lambda_0=1$ and the remaining eigenvalues decay rapidly, with $1 \lambda_0 \geq \lambda_1 \geq \lambda_2 \geq \ldots \geq \lambda_{N-1}$. With this in mind, the remapping module 170 defines $\psi_i=(\psi_{i1}, \psi_{i2}, \ldots, \psi_{iN})$ for each i between 0 and N−1. It should be noted that $\psi_{0j}=1/\sqrt{N}$ for each j between 1 and N.

In step 850, according to one exemplary embodiment, the remapping module 170 defines a diffusion map $\Psi=(\lambda_1\psi_1, \lambda_2\psi_2, \ldots, \lambda_{N-1}\psi_{N-1})$. $\Psi$ is best appreciated as a set of N−1 column vectors $\lambda_1\psi_1, \lambda_2\psi_2, \ldots, \lambda_{N-1}\psi_{N-1}$. While $\lambda_0\psi_0$ could be included in $\Psi$ for completeness, its contribution in the corresponding row vector distances is 0 since every entry is just $1/\sqrt{N}$. For the ith eigenvector $\psi_i$ and jth asset $x_j$, the remapping module 170 defines $\psi_i(x_j)=\psi_{ij}$.

The remapping module 170 also defines $\Psi(x_j)=(\lambda_1\psi_1(x_j), \lambda_2\psi_2(x_j), \ldots, \lambda_{N-1}\psi_{N-1}(x_j))=(\lambda_1\psi_{1j}, \lambda_2\psi_{2j}, \ldots, \lambda_{N-1}\psi_{N-1,j})$ to be the corresponding row vector of the jth asset $x_j$ under $\Psi$. From diffusion map theory (subject to requirements of the similarity kernel that are or are nearly exhibited in many or most that might be considered for evaluating asset correlation), $\Psi$ preserves or nearly preserves the distance between corresponding row vectors that was present in the probability transition matrix P.

Thus, in step 860, the display module 180 displays each asset $x_j$ on a 3-D display (or on a 2-D display using a 2-D rendition of the 3-D image) by using the three most significant components of the diffusion map, namely the corresponding point $(\lambda_1\psi_{1j}, \lambda_2\psi_{2j}, \lambda_3\psi_{3j})$, in a scatter diagram of the different assets, such as, for example, the scatter diagrams of FIGS. 3-6. In one embodiment, the display module 180 treats $\lambda_0\psi_{0j}$ as the least significant component in the diffusion map (since it is constant and thus makes no distance contribution between assets), while the contribution from the further components $\lambda_4\psi_{4j}, \lambda_5\psi_{5j}, \ldots, \lambda_{N-1}\psi_{N-1,j}$, diminishes rapidly from the diminishing values of the eigenvalues $\lambda_4, \lambda_5, \ldots, \lambda_{N-1}$. The diminishing eigenvalue property is such that for practical purposes, three dimensions is sufficient to pictorially present the assets $x_1, x_2, \ldots, x_N$ in a scatter diagram, while five dimensions is sufficient for most numerical calculation applications (as may be computed using the analysis module 190 that processes the diffusion map data).

In other embodiments, the fourth and fifth dimensions may be displayed in other ways, such as the color of the symbol used in the scatter diagram, the size of the symbol, the intensity of the symbol, the orientation of the symbol, and the like. In still other embodiments, the additional ways of displaying quantities are used to express different values related to the assets, such as market cap or portfolio weight, stocks of interest, volatility, and the like.

In this regard, the remapping $\Psi$ not only allows the display module 180 to visually display correlation distance between assets in a low-dimensional space (such as two or three dimensions) on a display device, extending the calculations to five or six dimensions allows the analysis module 190 to perform accurate numerical analysis of the correlation distances using orders of magnitude fewer calculations than would be required if, for example, all 100 or 500 dimensions were considered using the probability transition matrix P alone.

While the process of FIG. 8 is defined in terms of a 3-D scatter diagram, in other embodiments, different numbers of dimensions are displayed. For example, in one embodiment, the two most significant components $(\lambda_1\psi_{1j}, \lambda_2\psi_{2j})$ of the diffusion map are used to construct a corresponding 2-D scatter diagram.

FIG. 9 is a flow diagram of the computations that are performed for generating a scatter diagram according to the process of FIG. 8 when the process is applied to a small number of assets and using K(x,y)=corr(x,y) according to an embodiment of the present invention.

In the example of FIG. 9, three assets $x_1$, $x_2$, and $x_3$ are chosen to demonstrate the execution of the individual steps of the process of FIG. 8. The separately labeled steps 910-960 of FIG. 9 correspond to steps 810-860 of method 800.

In FIG. 9, the correlation module 160 defines the similarity kernel K in step 910 for each of the pairs of assets, in this case using K(x,y)=corr(x,y). The correlation module 160 builds the correlation matrix M from this similarity kernel data in step 920.

In step 930, the correlation module 160 converts the correlation matrix M to the probability transition matrix P. The remapping module 170 determines the eigenvalues $\lambda_0, \lambda_1$, and $\lambda_2$ of the transition matrix P along with the corresponding eigenvectors $\psi_0, \psi_1$, and $\psi_2$ in step 940. From these, the remapping module 170 determines the diffusion map $\Psi$ in step 950, from which the display module 180 determines the coordinates (in a 2-D Euclidean space) to display on a display device in step 960. It should be noted that the distances between these 2-D points generated in step 960 and the corresponding distances between their respective row vectors in the transition matrix P are either identical or practically identical, which is one of the properties of diffusion maps.

The method of diffusion maps is general enough to handle a wide variety of similarity kernels. An attractive feature of the method is that it is quite robust to noise: small perturbations in the input financial data do not have large effects on the results. This robustness is helpful when dealing with real world financial data, which often contain a scattering of spurious values.

Other Similarity Kernels

While most of the above embodiments were discussed with reference to an exemplary similarity kernel K(x,y)=1+corr(x,y), the present invention is not limited thereto. In other embodiments, K(x,y) may represent any similarity kernel. For example, in other embodiments, K(x,y) may be:

The $R^2$ kernel: K(x,y) is the $R^2$ of a linear least-squares regression between the periodic returns of x and y. The $R^2$ kernel is closely related to the absolute correlation kernel |corr(x,y)| discussed below.

The angle kernel: Regarding the series of r returns on an asset as a vector in r-dimensional space, K(x,y) is the angle between the return vectors of x and y. More precisely, K(x,y) is π/2 minus this angle. That is, a smaller angle means that x and y are more similar.

The absolute correlation kernel: K(x,y)=|corr(x,y)| is given by the absolute value of the standard correlation coefficient corr(x,y). This similarity kernel does not take directionality into account. For example, a stock and a short position in that stock are regarded as very dissimilar by the correlation kernel 1+corr(x,y), but are as similar as possible using the other three kernels mentioned thus far.

The $R^2$ kernel, the angle kernel, and the absolute correlation kernel often give qualitatively similar results. However, still other possible kernels may not produce similar results. For instance, other kernels may capture different notions of similarity. For example, in another exemplary embodiment, K(x,y) may be the distance kernel: K(x,y) is given by (a suitable transformation of) the Euclidean distance between the return vectors of x and y. Unlike the above examples, this similarity kernel takes asset volatilities (and hence leverage) into account. For example, a stock and a 2× leveraged position in that stock are not regarded as very similar by the distance kernel, but are as similar as possible using the previous four kernels above.

U.S. Equity Co-Movement Over the Past Decade

To further illustrate a method according to one embodiment of the present invention, monthly total return data for the period January 2002 to April 2012 is analyzed for the index constituents of the S&P 100 U.S. equity securities. There are considerably more than 100 stocks in the sample, since many stocks moved into or out of the index over the full time period.

Figure 10:
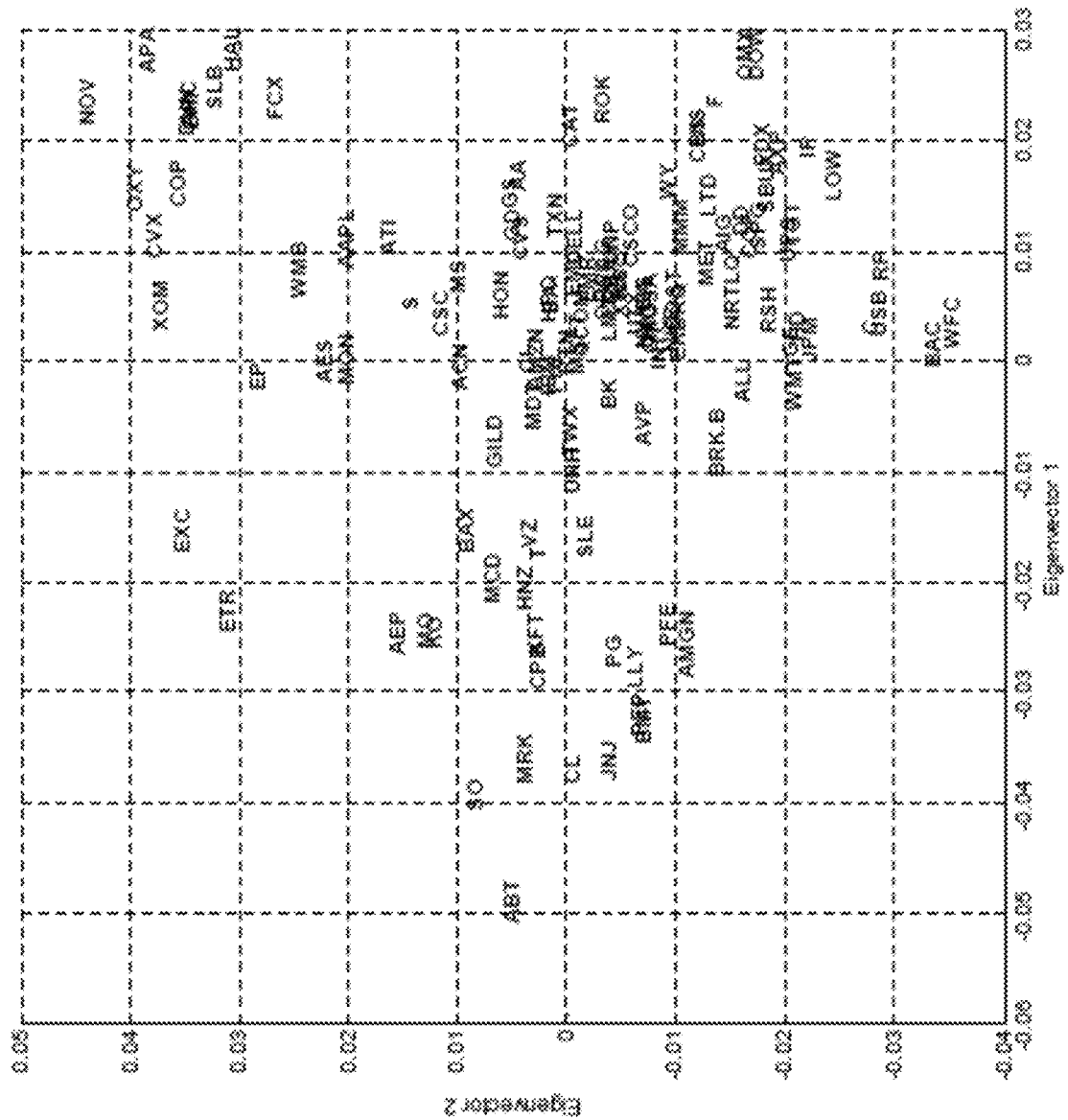
FIGS. 10-12 show exemplary 2-D and 3-D scatter diagrams of S&P 100 return data according to an embodiment of present invention.
Figure 11:
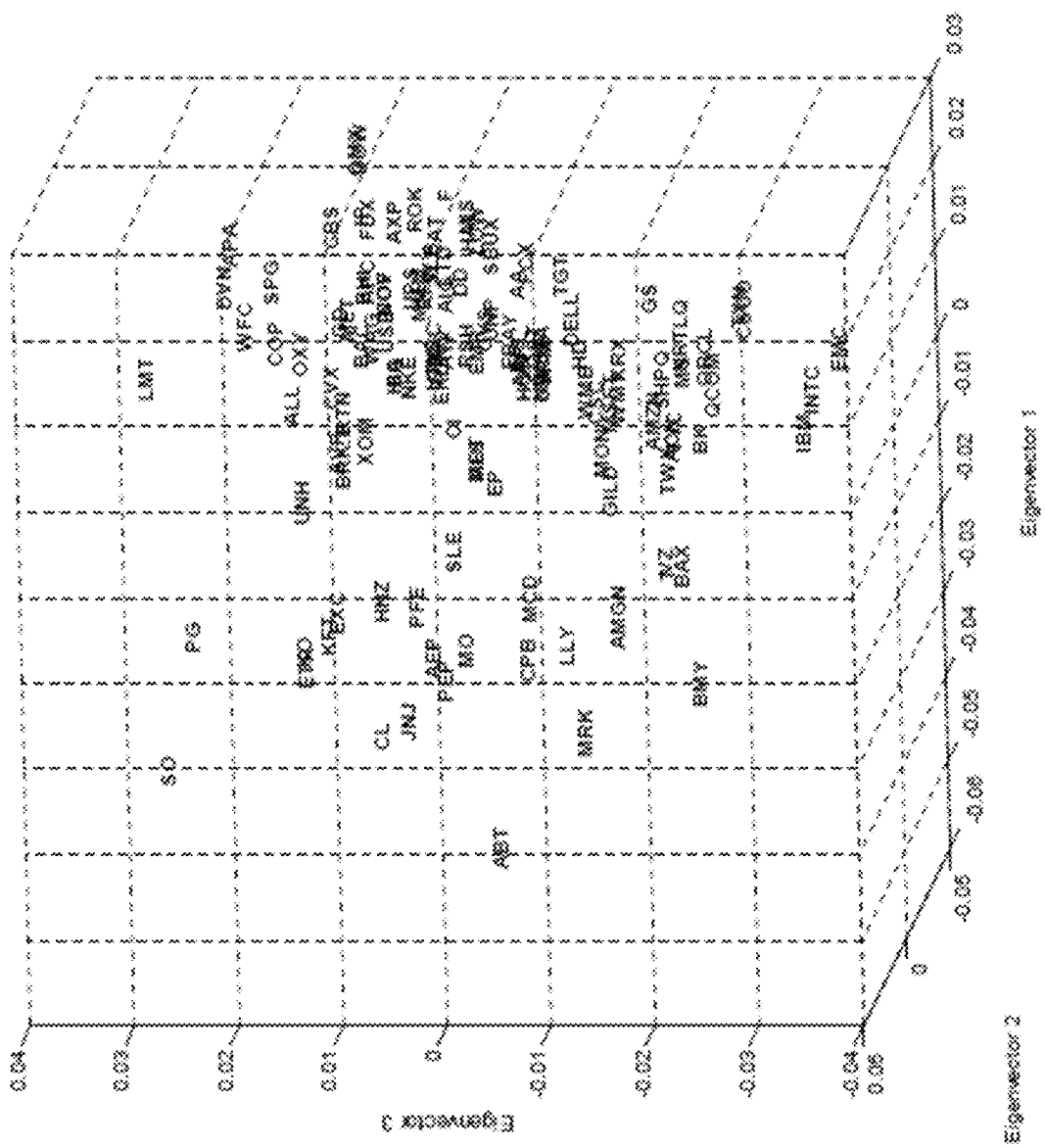
Figure 12:
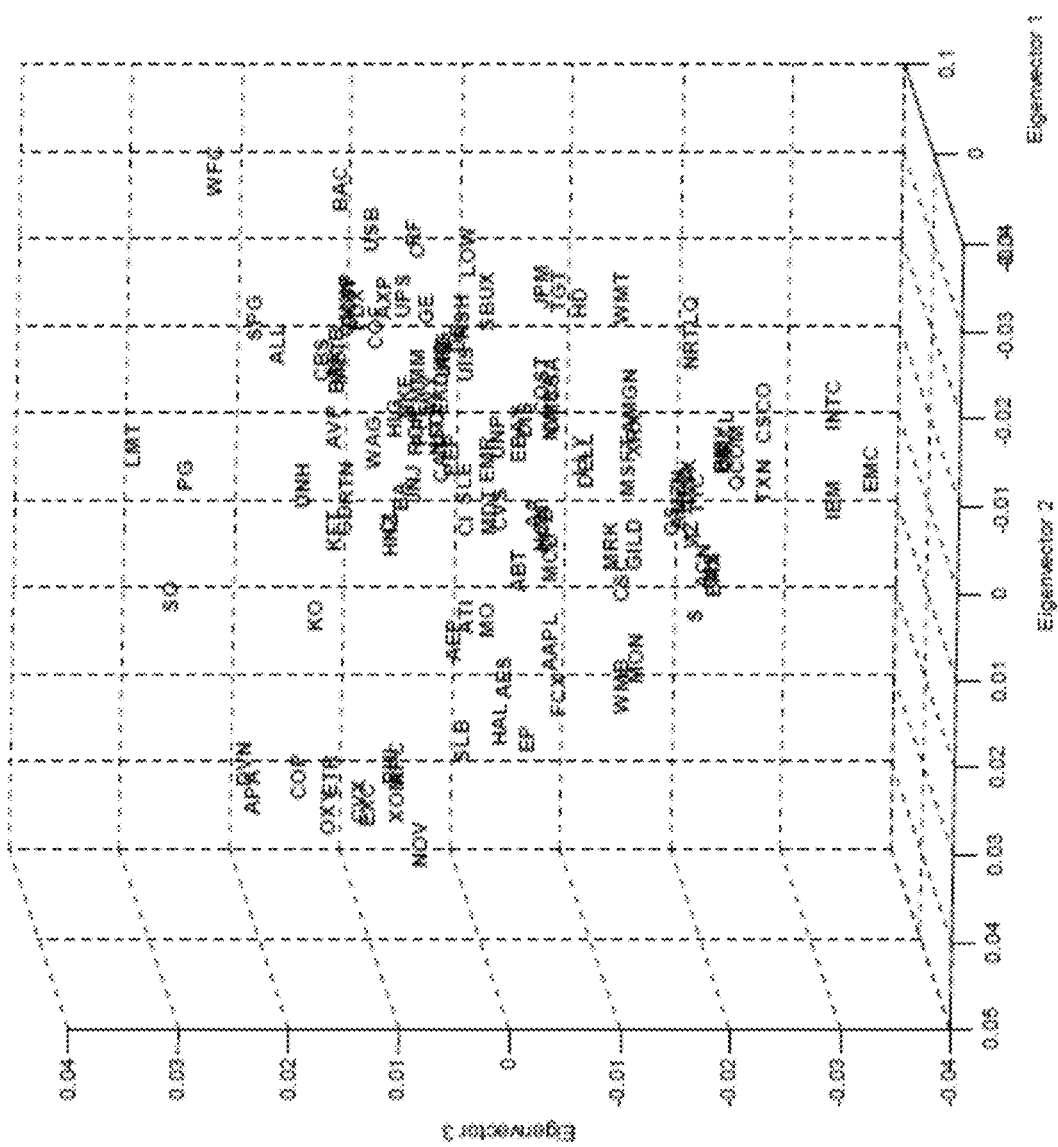

FIGS. 10-12 show exemplary 2-D and 3-D scatter diagrams of S&P 100 return data for the period January 2002 to April 2012 according to an embodiment of the present invention.

These scatter diagrams shows the results of applying the diffusion map method to S&P 100 constituent returns over the full decade of data, using the angle kernel. FIG. 10 shows a 2-D scatter plot (using the two most significant eigenvalues and their eigenvectors), while FIGS. 11-12 show two views of a 3-D scatter plot (using the three most significant eigenvalues and their eigenvectors). The two different views in FIGS. 11-12 help bring out some of the spatial structure of the diffusion map. Another way to observe the 3-D characteristics is to use the display module 180 to manipulate the graph on the display device, such as with rotations, panning, or zooming. In one exemplary embodiment, the 3-D scatter plot may be manipulated live by a user (such as by being rotated, panned, or zoomed) interacting with the display module 180.

The diffusion map, as displayed by the display module 180 in the scatter diagrams in FIGS. 10-12, exhibits some interesting properties. The stock symbols tend to form a cloud, with companies in the same industry often being clustered together. For example, in FIG. 10, energy companies appear at the top right, (ConocoPhillips, COP; Apache; APA; Occidental Petroleum, OXY; etc.); pharmaceuticals and health care at the left (Merck, MRK; Baxter International, BAX; Abbott Laboratories, ABT; etc.); some banks at the bottom (Citigroup, C; Bank of America, BAC; US Bancorp, USB; etc.); and PC/server related firms in the middle (Dell, DELL; Microsoft, MSFT; etc.) of the cloud.

In addition, the clusters have different locations relative to the center of mass of the cloud. For example, in FIGS. 10-12, the PC/server related firms are near the center of the cloud, while the energy companies and the banks are at roughly opposite edges. Sometimes, a firm is some distance away from other firms in the same industry. For example, Apple (AAPL) and Gilead Sciences (GILD) appear sometimes in, FIGS. 10-12 to be separated from others in their industry. Conversely, firms may be close to other firms that are in different industries. For example, the home improvement related stocks Lowe's (LOW) and Home Depot (HD) are close to the banks that engage in mortgage lending. This correlation may make sense given the time period, which encompasses the US housing boom and bust.

It should be noted that the 2-D representation in FIG. 10 may be sometimes misleading. For example, FIG. 10 overstates the degree of co-movement between Pfizer (PFE) and Amgen (AMGN), which appear more separated in FIGS. 11-12 because of the added third eigenvector. Each new eigenvector contributes successively less separation (because of the decaying eigenvalues), so three eigenvectors is frequently sufficient to exhibit the key separations, while very little distance impact is experienced after considering the first four or five eigenvalues and their eigenvectors. According to one exemplary embodiment, the display module 180 displays extra eigenvectors, such as the fourth or fifth most significant eigenvectors, on a display device through use of color or size of the symbols. According to another exemplary embodiment, the display module 180 may configure the axes to display different combinations of the first four or five eigenvectors at different times on the display device, which may be used for making sure properties being exhibited in displays of the first two or three eigenvectors are not significantly affected by the eigenvectors not being displayed.

With the diffusion map as exhibited in FIGS. 10-12, a person of skill in the art should recognize that an important feature of the diffusion map is the distances between points, which represent the correlation of different stocks. This same distance information is preserved even if the cloud is shifted or rotated. Further, the relative distances between different pairs of stocks have significance. That is, the distances may also be used to compare pairs of stocks where the distances are large. For example, in FIGS. 10-12, the fact that BAC and DELL are closer together than BAC and OXY is meaningful (e.g., DELL exhibits more similar behavior to BAC than OXY does), even though both of these relative distances are quite large.

Figure 13:
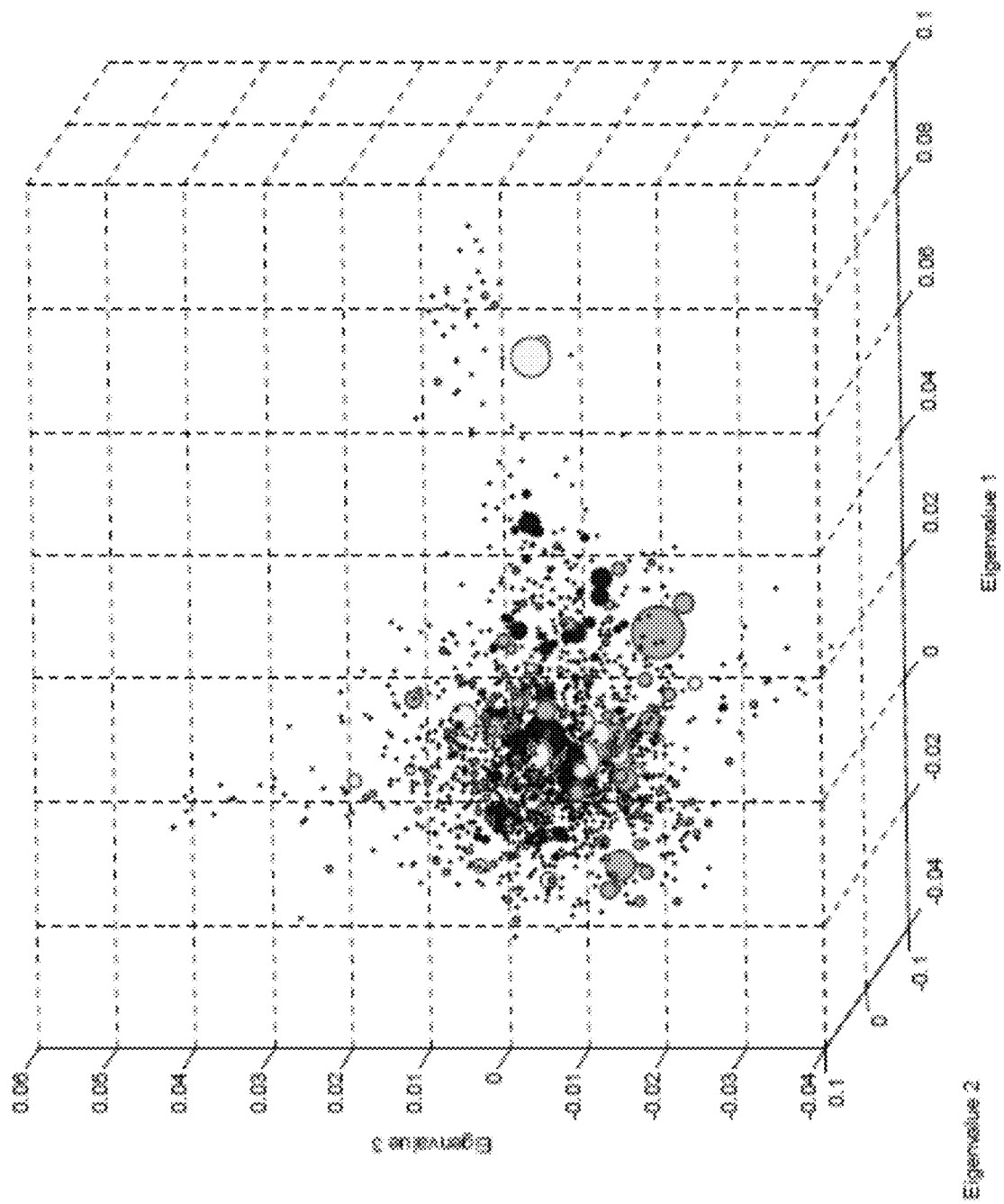
FIG. 13 shows an exemplary 3-D scatter diagram of S&P 500 return data accumulated over three different periods according to an embodiment of the present invention.

FIG. 13 shows an exemplary 3-D scatter diagram of S&P 500 return data accumulated over three different periods according to an embodiment of the present invention.

As shown in FIG. 13, the stock symbols may be replaced with other representations, such as, for example, colored dots, with three diffusion maps overlaid, each of the diffusion maps generated using S&P 500 return data from three different multi-year sub-periods using the $R^2$ kernel. The most recent period (July 2009 to April 2012) may be represented in a first color, while July 2007 to June 2009 (the "crisis period") may be represented by a second color, and July 2003 to June 2007 (the "credit boom") may be represented in a third color. The size of the symbols may correspond to the average index weight of the corresponding stock over the relevant period.

FIG. 13 gives an idea how the overall diffusion map cloud may take on different sizes and concentrations over different periods. For example, from FIG. 13, the cloud may be seen as quite scattered during the credit boom, then contracted during the crisis period as stocks began to move more closely together, and remained more compact in the most recent period, particularly taking index weights into account.

While these overlaid diffusion maps in FIG. 13 contain quite a bit of information, this exhibit may be hard to read. It may be useful to have a quantitative measure of the global tendency of assets to move together, such as the size or compactness of the cloud as a whole. It may also be useful to be able to identify the most significant local concentrations within the cloud. Through use of the analysis module 190, the diffusion map method may also be applied to those problems.

Measuring Overall Portfolio Diversification

The size of the cloud, or the extent to which it is spread out may reveal information about diversification across an entire group of assets, such as how much they all tend to move together, or how globally concentrated they are. A single summary measure may be useful. For example, it may allow portfolio concentration or diversification to be gauged with a single number, which may help with the selection of component assets in the portfolio. Embodiments of the present invention may compute such summary measures using the diffusion map and the analysis module 190.

Figure 14:
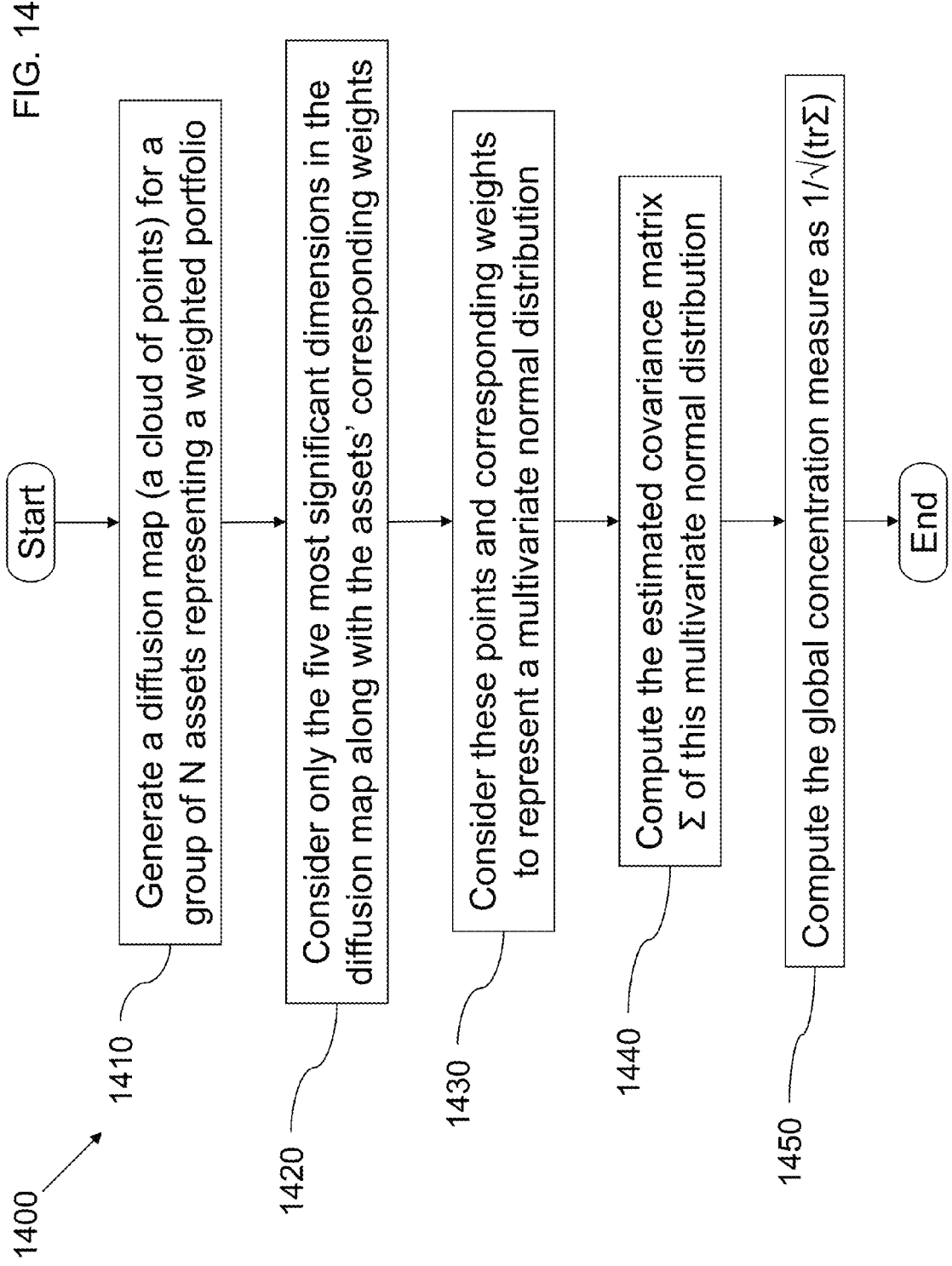
FIG. 14 shows an exemplary method of generating a single summary measure of the diversification of a group of assets in a portfolio according to an embodiment of the present invention.

FIG. 14 is a flow diagram of a process for generating a single summary measure of the diversification of a group of N assets in a portfolio according to an embodiment of the present invention. The process may be described in terms of a software routine implemented, for example, by the analysis module 190. A person of skill in the art should recognize, however, that the process may be implemented via hardware, firmware (e.g. via an ASIC) or any combination of software, firmware, and/or hardware. Furthermore, the sequence of steps of the process is not fixed, but can be altered into any desired sequence as recognized by a person of skill in the art.

In step 1410, the remapping module 170 generates a diffusion map for the group of N assets (using, for example, the process described with respect to FIG. 8). This diffusion map generation creates a cloud of points in N-dimensional space (whose 2-D and 3-D representations are discussed above). In step 1420, the analysis module 190 reduces the cloud to some small number of dimensions (for example, five) among the most significant dimensions (using, for example, the most significant non-trivial eigenvalues and eigenvectors from the diffusion map generated by the remapping module 170). In addition, the analysis module 190 weights each point in the diffusion map by its portfolio weight. For example, to evaluate an index such as the S&P 500, the weight of a particular stock corresponds to its weight in the index.

The cloud may have a fairly irregular shape. However, in step 1430, this property may be ignored, and the weighted sample of points may be assumed to have been taken from a multivariate normal distribution. This assumption allows the parameters of this multivariate normal distribution to be determined using standard methods. For example, in step 1440, according to one exemplary embodiment, the analysis module 190 determines the estimated covariance matrix $\Sigma$ from the weighted sample of points. The covariance matrix $\Sigma$ describes the "extent" of the cloud: the larger the variances, the bigger the cloud.

In step 1450, the analysis module 190 defines the global concentration measure to be $$1/\sqrt{(tr\Sigma)},$$

where $tr\Sigma$ is the trace of $\Sigma$, that is, the sum of the main diagonal entries of $\Sigma$. Thus, the higher the global concentration, the smaller the cloud (taking the weights into account). According to one exemplary embodiment, since the analysis module 190 carries out this global concentration measure computation using only the first five coordinates in the diffusion map, significant amounts of computation are saved compared to using all N coordinates (for example, when N=500). It should be noted that the scale of the global concentration measure may depend on parameters such as the sample population of assets, the length of the return series, the number of coordinates used in the calculation, etc. Accordingly, in one exemplary embodiment, these parameters are held constant.

Using example techniques such as method 1400, the analysis module 190 may quickly and succinctly measure the overall portfolio concentration and diversification. These portfolio concentration and diversification measurements may allow those using the measurements to adjust assets or their corresponding weights in the portfolio to achieve a more desired concentration or diversification. According to one embodiment, based on the global concentration measurement, one or more assets may be recommended to a user for including and/or excluding from the current portfolio.

In one exemplary embodiment, the global concentration measure for a known index, such as the S&P 500, is compared to that of an actively managed portfolio containing constituents from the same index, such as from the S&P 500 index constituents. In this embodiment, and using the S&P 500 as the example index, the analysis module 190 computes the global concentration measure for the S&P 500 using the S&P 500 index weights (using, for example, the method of FIG. 14). In addition, the analysis module 190 also computes the global concentration measure for the portfolio of interest using the diffusion map coordinates computed for the S&P 500 index constituents, but using portfolio weights rather than the index weights. Then the analysis module 190 can output the ratio between the portfolio global concentration measure and the S&P 500 index global concentration measure as a relative global concentration measure. The relative global concentration measure provides a way to compare the diversification of the portfolio of interest to that of the S&P 500. In one exemplary embodiment, this process is extended to portfolios with holdings outside of the S&P 500.

Local Concentrations within a Portfolio

As well as assessing global concentration, i.e., how diversified the whole group is, local concentration can also be analyzed. For example, suppose assets can be subject to localized or idiosyncratic shocks that affect only specific regions of the abstract space of assets. It would be beneficial to know which of these shocks are the most important (e.g., have the greatest potential impact). In other words, in which regions are the assets most concentrated? Another way to phrase this is, where are the local concentrations within a portfolio?

To help make this idea more precise, consider a functional form for a "local shock function" that describes such a localized shock. It is convenient to take a symmetrical normal density function, rescaled to have unit maximum—this describes a shock that has a smooth peak at a single point in space and decays fairly rapidly after that. The extent of the shock can be specified by the scale parameter $\epsilon$ in the normal density function: choosing a larger value of $\epsilon$ corresponds to focusing on shocks that affect assets in a wider local region, (such as "less idiosyncratic" shocks). It should be noted that it only makes sense to give this spatial definition of a "local shock" because a geometrical representation of the correlation matrix was defined in terms of a Euclidean space.

According to one embodiment, the weighted points in the cloud may be regarded as collectively describing a discrete measure on Euclidean space. For a given shock location, the integral of the local shock function with respect to this measure describes the total impact of the shock on the whole group of assets. It should be noted that this integral is really just a finite sum, and the contribution to the sum comes mainly from stocks closer to the center of the shock, and with higher market caps. The (largest $\epsilon$-)local concentration is given by the location that maximizes the value of this integral. According to one embodiment, only the first several coordinates of the diffusion map (for example, five) are used in this calculation, assuming that these coordinates capture most of the relevant information.

Figure 15:
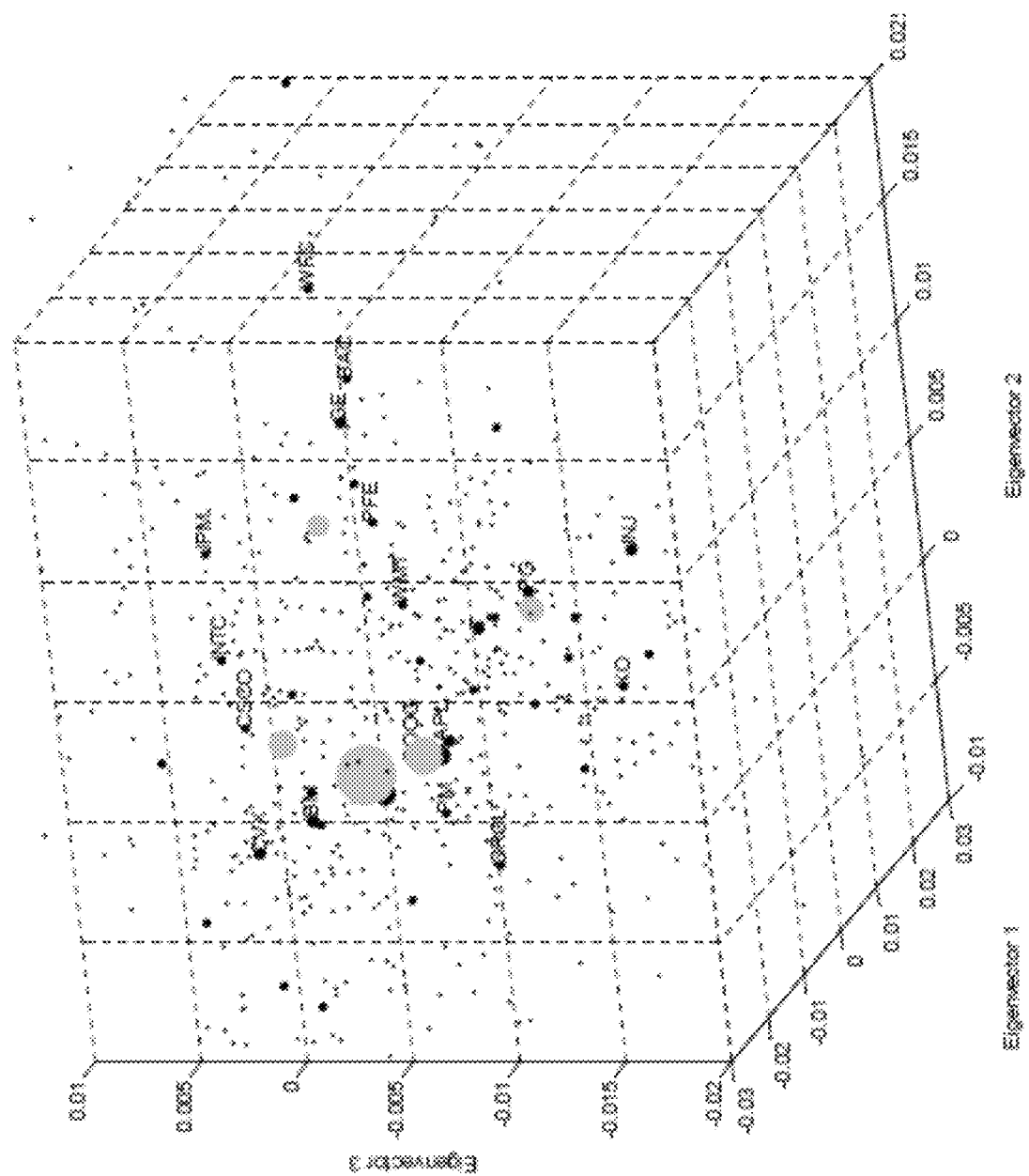
FIG. 15 shows an exemplary 3-D scatter diagram of S&P 500 return data highlighting five local concentrations according to an embodiment of the present invention.
Figure 16:
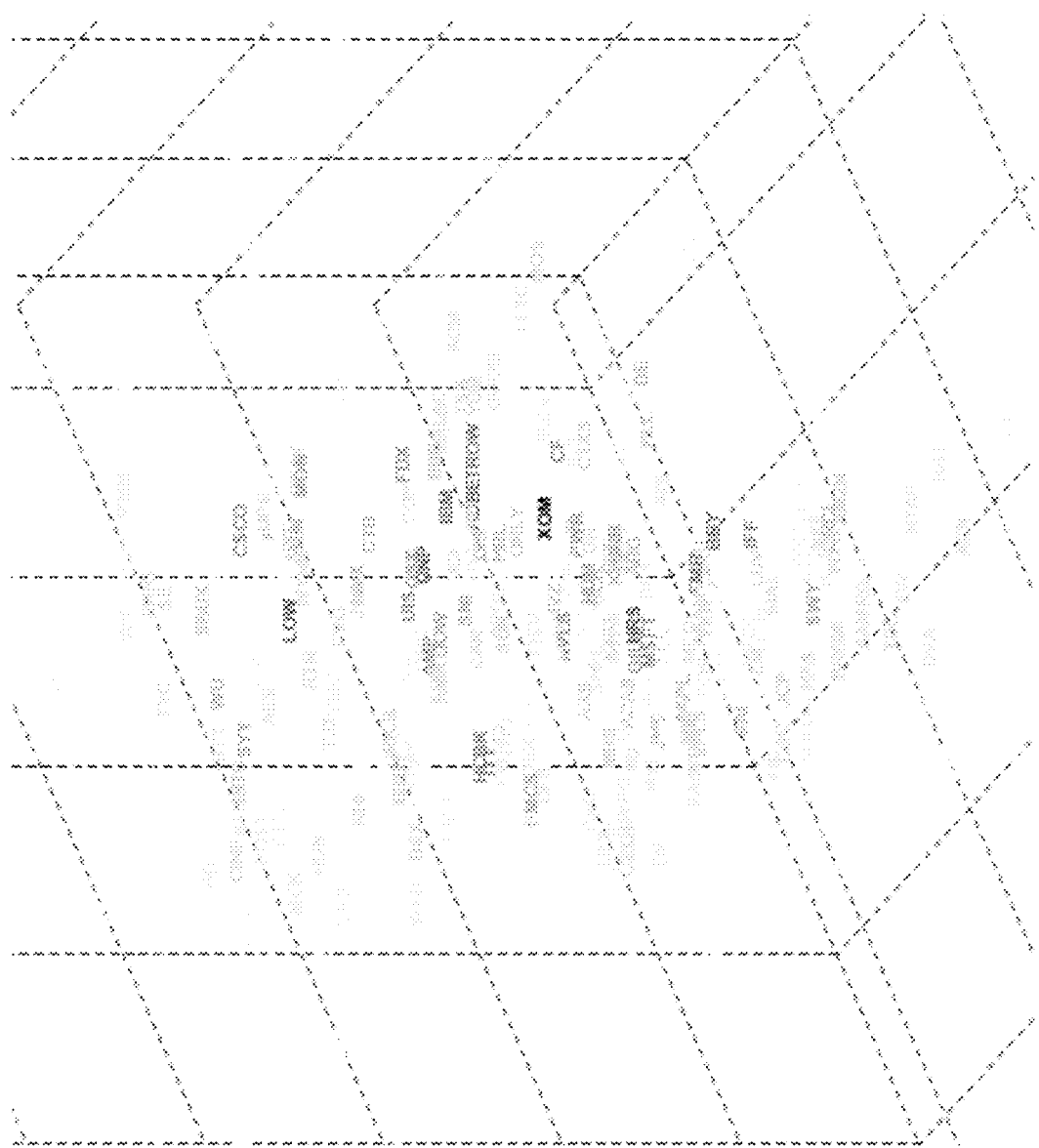
FIG. 16 shows an exemplary 3-D scatter diagram of S&P 500 return data zooming in on the largest local concentration in FIG. 15 according to an embodiment of the present invention.

FIG. 15 shows an exemplary 3-D scatter diagram of S&P 500 return data highlighting five local concentrations according to an embodiment of the present invention. FIG. 16 shows an exemplary 3-D scatter diagram of S&P 500 return data zooming in on the largest local concentration in FIG. 15 according to an embodiment of the present invention.

FIG. 15 shows the diffusion map for the S&P 500 index, using the $R^2$ kernel and monthly total returns during the post-crisis (2009-2012) period. The size of each symbol corresponds to the 2012 market cap of the stock. The figure also shows, in gray, the five largest local concentrations identified as above, using the scale parameter $\epsilon=0.005$, which corresponds to a shock extending over about the width of two grid cubes in the diagram.

As can be seen in FIG. 15, the largest local concentration is near the center of the cloud, where the shock can pick up quite a few stocks, including some with fairly large market caps such as XOM and IBM. The second largest local concentration is very close to AAPL and Google, GOOG. Another important local concentration is near Procter & Gamble, PG.

FIG. 16 zooms into the largest local concentration to give a closer look at the stocks affected. In FIG. 16, the intensity of the ticker symbols indicate the local shock function of the corresponding asset, namely the proximity of the corresponding asset to the center of the shock, with darker shading (such as for XOM) indicating the closest to the center, and lighter shading indicating progressively further from the center (and hence, less affected by the shock). It is apparent that this local shock affects a number of stocks from different sectors that have had a tendency to move together during the recent period.

One can now iterate the calculation of local concentration as follows:

(1) Specify a scale parameter $\epsilon$.
(2) Find the largest local concentration, as above.
(3) "Subtract the local shock from the weights"; i.e., for each stock, multiply the market cap by (1−value of local shock function at that stock).
(4) Return to step 2, and repeat as many times as desired.

The result of this process is the ($\epsilon$-)local concentration profile, which shows the size (and location) of shocks, of decreasing importance, that can affect the cloud. The local concentration profile contains information on the concentration/diversification of the group of assets over and above the information in the global concentration measure.

The choice of scale parameter $\epsilon$ is important. The local concentration profile depends on the choice of the scale parameter $\epsilon$, and different choices of $\epsilon$ may reveal different aspects of the data. If $\epsilon$ is too large, it may pick up too many stocks in its corresponding local shock (for instance, practically the whole cloud may become a shock). This may reduce the local concentration profile to a list of stocks weighted jointly by their proximity to the center of the cloud and to their portfolio weight (or market cap). On the other hand, if $\epsilon$ is too small, it may only pick up only one (or essentially one) stock at a time. Accordingly, the local concentration profile may simply be the list of individual stocks in descending order of portfolio weight. Using scatter diagrams (such as those in FIGS. 15-16) according to embodiments of the present invention, one of ordinary skill in the art can find appropriate values of the scale parameter $\epsilon$ for a particular set of assets to determine useful local concentration profiles without undue experimentation.

As with the global concentration, and using the S&P 500 as an exemplary (and non-limiting) index, the local concentration profile according to embodiments of the present invention can be extended to actively managed portfolios that only hold S&P 500 index constituents. In one exemplary embodiment, the signed measure defined by the portfolio relative weights is used in place of the S&P 500 weights, and a similar maximization procedure (as that described above) to determine the (signed) relative local concentrations of the portfolio versus the S&P 500 index.

Using Embodiments of the Invention to Help Make Investment Decisions

Through use of the visualization and analysis tools of embodiments of the present invention, an investor or financial advisor may gain a better understanding of how correlations have changed over time, which may help the investor form a qualitative judgment about how the correlations may continue in the investment horizon. Investment decisions may be made based on such correlations.

According to one embodiment, the scatter diagrams and associated correlation data may be used for diversification of a portfolio to reduce risk. Diversification may not necessarily be best achieved by owning a large number of companies, or companies across a broad range of industries. It may be preferable to own a smaller number of positions, but make sure they are spread out across different places in the cloud, far apart from each other.

According to one embodiment of the invention, the display module 180 may be configured to display a scatter diagram depicting correlations between assets, and further configured to receive a user selection of one of the assets in the scatter diagram. In response to the selection of the asset, the display module 180 may be configured to identify a second asset with a maximum distance from the selected asset, or other desired position relative to the selected asset. The second asset may be highlighted in the scatter diagram, information about the second asset retrieved from the storage device 130, and/or the second asset recommended to the user as an asset that has the furthest correlation to the selected asset. In response to such recommendation, the user may select the second asset and input the second asset into a software application configured to generate a portfolio based on selected assets.

According to one embodiment, existing funds (such as mutual funds) are analyzed to see how their constituent assets measure up to an established index, such as the S&P 500. This can be done at the global concentration level and at the local concentration level, as described above. For instance, to modify the fund to behave closer to the S&P 500, its constituent assets can be adjusted to produce a similar global concentration and a similar local concentration profile as that of the S&P 500.

According to one embodiment, existing funds are analyzed to see how diverse or concentrated their holdings are. Here, the goal may be to increase diversification by selecting or adjusting constituent assets to lower the global concentration as well as identify and mitigate any large local concentrations, as measured by the exemplary techniques described above.

According to one embodiment, existing funds are analyzed using the above techniques to see how diverse they are from each other. Here, the goal may be to consolidate funds that have similar behavior, to maintain the diversity of funds with different behavior (by adjusting constituent assets that maintains this diversity), or to assist with selection of constituent funds for a fund-of-funds investment vehicle.

Figure 17:
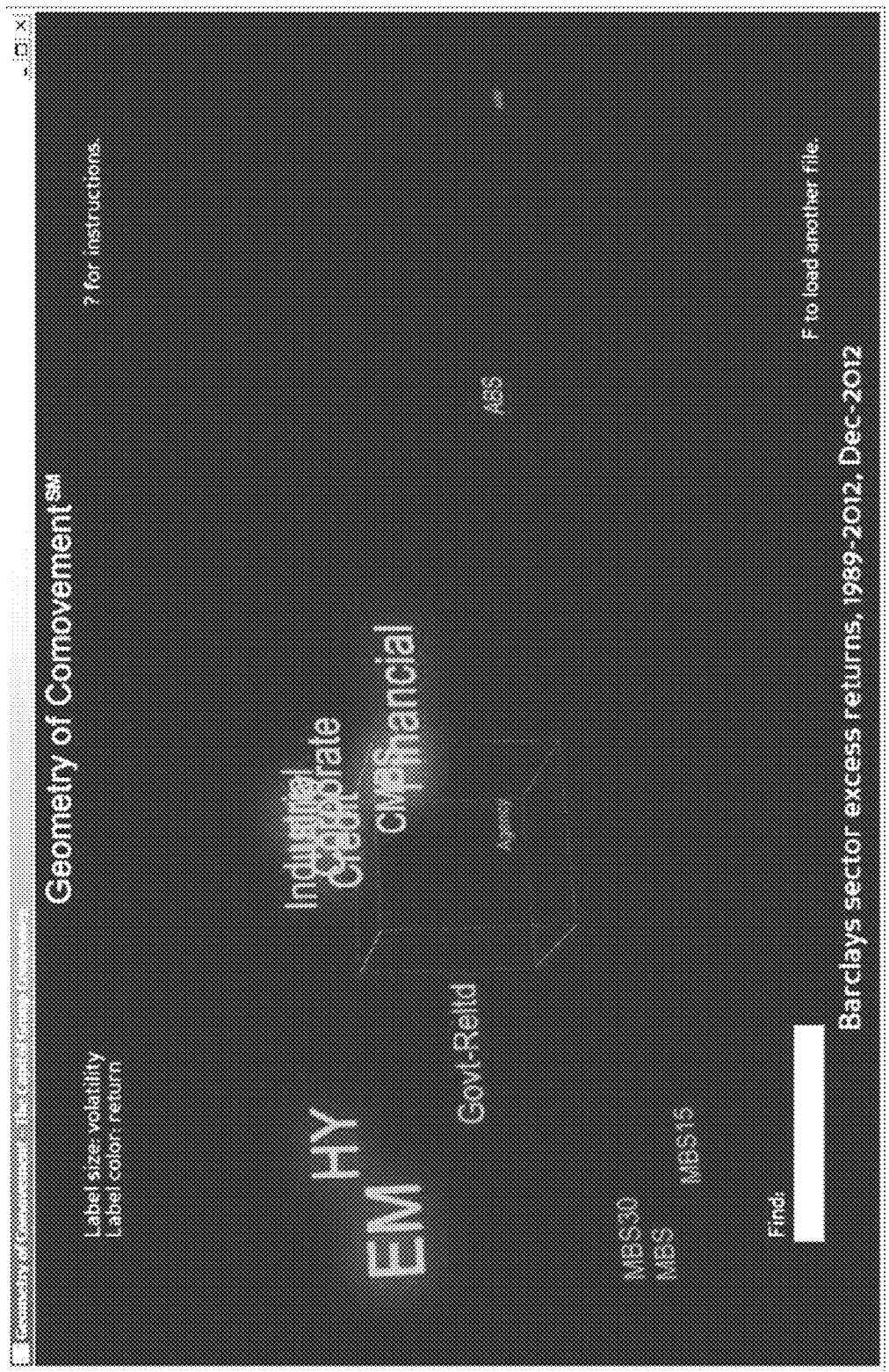
FIG. 17 shows an exemplary 3-D scatter diagram of individual sectors of the U.S. bond market according to an embodiment of the present invention.

FIG. 17 shows an exemplary 3-D scatter diagram of individual sectors of the U.S. bond market according to an embodiment of the present invention.

In FIG. 17, individual sectors of the U.S. bond market are displayed as the collection of financial assets. Here, the label size for each of the different bond classifications, such as Financial, Corporate, Industrial, or MBS (mortgage-backed securities), in used to indicate the relative volatility of the particular bond. As with the display of stocks in some of the earlier figures, in FIG. 17, the distance between the different labels is inversely proportional to the correlation of the corresponding bond sectors. For example, the five central bond sectors in FIG. 17—namely, Industrial, Corporate, Credit, CMBS (commercial MBS), and Financial—are close together, showing strong correlation between these sectors, while other sectors, such as MBS, ABS (asset-backed securities), and HY (high yield) are spread far apart, indicating less correlation between these sectors.

According to one embodiment, diagrams like the one shown in FIG. 17 are used to help assess how the individual bond sectors move relative to, for example, treasury securities. This can be useful to investors, for example, in deciding how much to allocate to different bond sectors, such as government bonds, corporate bonds, or mortgages.

According to one embodiment, a user invokes the one or more modules of the computer device for comparing a scatter diagram for an input set of financial instruments, portfolios, indices, or asset classes, to the scatter diagram for an existing set of financial instruments, portfolios, indices, or asset classes. In this regard, the user may invoke a graphical user interface provided by one or more modules of the computer device to select the input set (e.g. by selecting one or more identifiers of the input set), and further invoke the graphical user interface to select the existing set to be compared against (e.g. by selecting one or more identifiers of the existing set).

The user may further submit a command to generate a comparison of the scatter diagrams of the two sets. In response to such a command, one or more modules of the computer device may be configured to display the scatter diagram of the existing set via a particular visual depiction, and further display the scatter diagram of the input set according to a different visual depiction. The two scatter diagrams may be overlaid on top of each other. In this regard, a viewer of the two scatter diagrams may understand, at a glance, how the correlations in the input set track with the correlations of the existing set. Based on this understanding from the display, the user may invoke the graphical user interface to add and/or delete an asset to and/or from the input set, or to adjust an attribute (e.g. investment amount) with respect to an asset in the input set. In response to the user command, the computer device adds, deletes, and/or modifies the attribute as indicated by the user.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for displaying a matrix of correlations or other statistical measures of co-movement associated with a plurality of financial instruments, portfolios, indices, or asset classes, the method comprising:

converting the matrix of correlations or other co-movement measures into a probability transition matrix;

defining a corresponding abstract distance measurement between any two of the plurality of financial instruments, portfolios, indices, or asset classes based on the probability transition matrix;

assigning coordinates in a Euclidean space to each of the plurality of financial instruments, portfolios, indices, or asset classes, wherein a Euclidean distance between any two financial instruments, portfolios, indices, or asset classes in the Euclidean space corresponds to the corresponding abstract distance measurement;

displaying on a display device the plurality of financial instruments, portfolios, indices, or asset classes based on significant dimensions of the Euclidean space; and generating a measure of diversification of the financial instruments, portfolios, indices, or asset classes, wherein the measure of diversification comprises a global concentration, and the generating of the global concentration comprises:
assigning a weight to each of the financial instruments, portfolios, indices, or asset classes; and
weighting a contribution of each of the financial instruments, portfolios, indices, or asset classes by its respective said weight in the global concentration.

2. The method of claim 1, wherein a number of the significant dimensions is three.

3. The method of claim 2, wherein the significant dimensions comprises three of the most significant dimensions.

4. The method of claim 2, wherein the displaying of the financial instruments, portfolios, indices, or asset classes comprises displaying an identifying label for each of the financial instruments, portfolios, indices, or asset classes in a 3-dimensional Euclidean representation on the display device.

5. The method of claim 4 further comprising modifying the 3-dimensional Euclidean representation on the display device in response to a user command.

6. The method of claim 4 further comprising displaying successive representations of correlation data or other statistical measures of co-movement as observed on successive dates.

7. The method of claim 4 further comprising adjusting a color or size of the identifying label to correspond to a respective value of an additional numerical characteristic being displayed in the 3-dimensional Euclidean representation on the display device for each of the financial instruments, portfolios, indices, or asset classes.

8. The method of claim 1, wherein a number of the significant dimensions is two.

9. The method of claim 8, wherein the significant dimensions comprises two of the most significant dimensions.

10. The method of claim 8, wherein the displaying of the financial instruments, portfolios, indices, or asset classes comprises displaying an identifying label for each of the financial instruments, portfolios, indices, or asset classes in a 2-dimensional Euclidean representation on the display device.

11. The method of claim 1, wherein the generating of the measure of diversification of the financial instruments, portfolios, indices, or asset classes comprises generating the measure of diversification using the significant dimensions of the Euclidean space.

12. The method of claim 1, wherein the measure of diversification further comprises a relative global concentration or a largest local concentration.

13. The method of claim 1 further comprising generating a portfolio diversification measure by:
- identifying ones of the financial instruments, portfolios, indices, or asset classes;
- assigning second weights to respective said ones of the financial instruments, portfolios, indices, or asset classes; and
- generating the global concentration by only using the ones of the financial instruments, portfolios, indices, or asset classes in place of each of the financial instruments, portfolios, indices, or asset classes, and using the second weights in place of the weight of each of the financial instruments, portfolios, indices, or asset classes.

14. The method of claim 1 further comprising generating a sequence of local concentrations of the financial instruments, portfolios, indices, or asset classes.

15. The method of claim 1 further comprising generating a plurality of relative local concentrations of the Euclidean space.

16. The method of claim 1 further comprising generating a numerical summary measure of accuracy with which the Euclidean distance as measured in the significant dimensions of the Euclidean space represents the corresponding abstract distance measurement.

17. The method of claim 1 further comprising changing a sign of one of the coordinates for improving consistency of the displaying of the financial instruments, portfolios, indices, or asset classes over a period of time.

18. The method of claim 1 further comprising re-ordering the coordinates for improving consistency of the displaying of the financial instruments, portfolios, indices, or asset classes over a period of time.

19. The method of claim 1, wherein the financial instruments comprise publicly traded equity securities, publicly traded fixed income securities, publicly available mutual funds, exchange-traded funds, publicly traded currencies, exchange-traded futures, or options on exchange-traded futures.

20. The method of claim 1 further comprising:
- in response to the displaying on the display device, receiving a user command to modify an attribute for a selected one of the plurality of financial instruments, portfolios, indices, or asset classes; and
- modifying the attribute in response to the user command.

21. The method of claim 20, wherein the attribute corresponds to an investment amount.

22. The method of claim 1, wherein the correlations correspond to financial returns.

23. A system for displaying a matrix of correlations or other statistical measures of co-movement associated with a plurality of financial instruments, portfolios, indices, or asset classes, comprising:
- a processor;
- a display device coupled to the processor; and
- a nonvolatile storage device coupled to the processor and storing instructions that, when executed by the processor, cause the processor to:
  - convert the matrix of correlations or other co-movement measures into a probability transition matrix;
  - define a corresponding abstract distance measurement between any two of the plurality of financial instruments, portfolios, indices, or asset classes based on the probability transition matrix;
  - assign coordinates in a Euclidean space to each of the plurality of financial instruments, portfolios, indices, or asset classes, wherein a Euclidean distance between any two financial instruments, portfolios, indices, or asset classes in the Euclidean space corresponds to the corresponding abstract distance measurement;
  - display on the display device the plurality of financial instruments, portfolios, indices, or asset classes based on significant dimensions of the Euclidean space; and
  - generate a measure of diversification of the financial instruments, portfolios, indices, or asset classes, wherein
- the measure of diversification comprises a global concentration, and
- the instructions, when executed by the processor, further cause the processor to generate the global concentration by:
  - assigning a weight to each of the financial instruments, portfolios, indices, or asset classes; and
  - weighting a contribution of each of the financial instruments, portfolios, indices, or asset classes by its respective said weight in the global concentration.

24. The system of claim 23, wherein a number of the significant dimensions is three.

25. The system of claim 24, wherein the instructions, when executed by the processor, further cause the processor to control the display device to display the financial instruments, portfolios, indices, or asset classes by displaying an identifying label for each of the financial instruments, portfolios, indices, or asset classes in a 3-dimensional Euclidean representation on the display device.

26. The system of claim 25, wherein the processor is further configured to receive a user command and the instructions, when executed by the processor, further cause the processor to modify the 3-dimensional Euclidean representation on the display device in response to the user command.

* * * * *